US009941497B2

(12) United States Patent
Toyoda et al.

(10) Patent No.: US 9,941,497 B2
(45) Date of Patent: Apr. 10, 2018

(54) SEPARATOR FOR SECONDARY CELL

(71) Applicant: ZEON CORPORATION, Tokyo (JP)

(72) Inventors: Yujiro Toyoda, Tokyo (JP); Tomokazu Sasaki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 186 days.

(21) Appl. No.: 14/389,503

(22) PCT Filed: Apr. 4, 2013

(86) PCT No.: PCT/JP2013/060384
§ 371 (c)(1),
(2) Date: Sep. 30, 2014

(87) PCT Pub. No.: WO2013/151144
PCT Pub. Date: Oct. 10, 2013

(65) Prior Publication Data
US 2015/0333308 A1 Nov. 19, 2015

(30) Foreign Application Priority Data
Apr. 5, 2012 (JP) ................. 2012-086632

(51) Int. Cl.
*H01M 2/14* (2006.01)
*H01M 2/16* (2006.01)
*H01M 10/0525* (2010.01)
*C09D 5/02* (2006.01)
*C09D 7/12* (2006.01)
*H01M 10/0566* (2010.01)
*H01M 10/052* (2010.01)
*C08K 3/22* (2006.01)

(52) U.S. Cl.
CPC ............ *H01M 2/145* (2013.01); *C09D 5/028* (2013.01); *C09D 7/1216* (2013.01); *H01M 2/168* (2013.01); *H01M 2/1653* (2013.01); *H01M 2/1686* (2013.01); *H01M 10/0525* (2013.01); *C08K 3/22* (2013.01); *C08K 2003/2217* (2013.01); *C08K 2003/2227* (2013.01); *H01M 10/052* (2013.01); *H01M 10/0566* (2013.01); *H01M 2220/30* (2013.01)

(58) Field of Classification Search
CPC ..... H01M 2/145; H01M 2/1653; H01M 2/168
See application file for complete search history.

(56) References Cited

U.S. PATENT DOCUMENTS

| 7,250,472 B1* | 7/2007 | Farooq | .................. | C08L 33/10 525/209 |
| 2003/0215704 A1* | 11/2003 | Satsuma | ............. | H01M 2/1673 429/142 |
| 2011/0318630 A1 | 12/2011 | Wakizaka et al. | | |
| 2012/0115008 A1 | 5/2012 | Sano et al. | | |
| 2012/0315541 A1* | 12/2012 | Sasaki | .................. | H01M 4/131 429/211 |
| 2013/0011716 A1 | 1/2013 | Sano et al. | | |

FOREIGN PATENT DOCUMENTS

| CN | 102334215 A | 1/2012 |
| EP | 2372811 A1 | 10/2011 |
| JP | 2011-054503 A | 3/2011 |
| JP | 4806735 B1 | 8/2011 |
| JP | 2012-048932 A | 3/2012 |
| WO | 2010/074202 A1 | 7/2010 |
| WO | 2011-118660 A1 | 9/2011 |
| WO | 2012/020737 A1 | 2/2012 |
| WO | 2012/029805 A1 | 3/2012 |

OTHER PUBLICATIONS

The first Office Action issued by the Chinese Patent Office dated Jan. 22, 2016, which corresponds to Chinese Patent Application No. 201380018518.1 and is related to U.S. Appl. No. 14/389,503.
International Search Report; PCT/JP2013/060384; dated Jul. 9, 2013.
The extended European search report issued by the European Patent Office dated Nov. 19, 2015, which corresponds to European Patent Application No. 13772878.8-1360 and is related to U.S. Appl. No. 14/389,503.

\* cited by examiner

*Primary Examiner* — Jonathan G Jelsma
(74) *Attorney, Agent, or Firm* — Studebaker & Brackett PC

(57) ABSTRACT

Provided are a secondary battery separator having good heat durability, high adhesion property with the electrode active material layer formed on the current collector, and good anti-blocking property, and a secondary battery having such a secondary battery separator. The secondary battery separator of the present invention includes an organic separator layer, a heat-durable layer formed adjacent to at least one surface of the organic separator layer, and an adhesive layer formed on the heat-durable layer, wherein the heat-durable layer contains non-conductive particles and a binder, and the adhesive layer contains a particulate polymer having a glass transition temperature (Tg) of 10 to 100° C.

6 Claims, No Drawings

SEPARATOR FOR SECONDARY CELL

FIELD

The present invention relates to a secondary battery separator that are used for, e.g., a lithium ion secondary battery.

BACKGROUND

In recent years, handheld terminal devices such as laptop personal computers, cellular phones, and PDAs (Personal Digital Assistants) are being remarkably widespread. As the secondary batteries as the power source in these handheld terminal devices, e.g., lithium ion secondary batteries are often used. The handheld terminal devices are required to have a comfortable portability, and such devices are rapidly becoming more compact, thin and lightweight with better performance. As a result, the handheld terminal devices are now being used in a wide variety of situations. Like the demand on the handheld terminal devices, there also is a demand on the batteries to be smaller, thinner and lighter with better performance.

In a lithium ion secondary battery, upon charging, lithium elutes as a lithium ion from a positive electrode active material in a positive electrode to an electrolyte solution in an organic separator, and then enters into a negative electrode active material in a negative electrode. Upon discharging, the lithium ion that has been entered into the negative electrode active material in the negative electrode is discharged to the electrolyte solution, and returns to the positive electrode active material of the positive electrode. In this manner, act of charging/discharging is performed.

As the organic separator for use in a lithium ion secondary battery, e.g., a microporous membrane formed of a polyolefin resin is usually used. When inner-battery temperature rises to around 130° C., the organic separator melts and occludes the micropores. The organic separator thus has a shut-down function that inhibits migration of lithium ions and cuts off the electric current. In this manner, the organic separator plays a role of keeping safety of the lithium ion secondary battery. However, when the battery temperature exceeds, e.g., 150° C. due to instantaneously generated heat, the organic separator rapidly shrinks, and the positive electrode and the negative electrode directly contact to each other, to cause enlargement of short-circuited area. In this case, the battery temperature can rise to several hundred degrees Celsius, to be in a state of abnormal overheat.

In order to address this problem, there has been made studies on, e.g., a non-aqueous separator having an organic separator such as a polyethylene microporous membrane, and a heat-durable porous membrane layer (this may be referred to hereinbelow as "heat-durable layer") laminated on the surface of the organic separator. The porous membrane layer is a membrane having therein a large number of connected microporous structures. The porous membrane contains non-conductive particles, and a polymer binder for effecting binding of the non-conductive particles to each other, and binding of the non-conductive particles with the organic separator or a current collector (this polymer binder may be referred to hereinbelow as "binder").

The porous membrane layer may also be used in a form of being laminated on the electrode, or used as the organic separator itself.

Patent Literature 1 proposes a non-aqueous secondary battery separator including a polyolefin microporous membrane, and a heat-durable porous layer that is provided on one or both surfaces of the polyolefin microporous membrane and contains a heat-durable resin, as well as a non-aqueous secondary battery separator including a polyolefin microporous membrane, and an adhesive porous layer that is provided on one or both surfaces of the polyolefin microporous membrane and contains a vinylidene fluoride resin.

According to Patent Literature 1, the heat-durable porous layer preserves the polyolefin microporous membrane even at a temperature that is equal to or higher than the shutdown temperature, and thus reduces possibility of meltdown, to thereby ensure safety in a high temperature occasion. Patent Literature 1 also discloses that the adhesive porous layer improves adhesion with the non-aqueous secondary battery separator, whereby, in addition to the mechanical strength, shutdown property and anti-liquid depletion effect attributed to the polyolefin microporous membrane, the adhesive porous layer exerts excellent ion permeability and electrolyte solution preservability.

CITATION LIST

Patent Literature

Patent Literature 1: Japanese Patent Publication No. 4806735 B

SUMMARY

Technical Problem

A lithium ion secondary battery is usually produced by laminating a positive electrode having a current collector and a positive electrode active material layer and a negative electrode having a current collector and a negative electrode active material layer with a secondary battery separator interposed therebetween, then winding the laminate to form an electrode body, then putting the electrode body in an interior of a battery case, then pouring an electrolyte solution into the battery case, and then sealing the opening. When the separator described in Patent Literature 1 having the polyolefin microporous membrane and porous layer is used, the non-conductive particles in the porous layer and electrode active materials in the electrode active material layer tend to remove. Therefore, in order to prevent such a phenomenon, it is preferable to perform heat pressing upon laminating the positive electrode and the negative electrode with the secondary battery separator interposed therebetween.

However, according to the studies by the present inventor, the following was found out. That is, when the non-aqueous secondary battery separator in Patent Literature 1 having the polyolefin microporous membrane and porous layer is used, adhesion of the polyolefin microporous membrane or the adhesive porous layer with the electrode active material layer becomes insufficient upon lamination of the non-aqueous secondary battery separator with the electrode, wherein the electrode has the current collector and thereon the electrode active material layer containing the electrode active material. Consequently, the resulting electrode loses strength against mechanical forces during the process of winding, etc., and removal of the electrode active material, etc. (powder falling) cannot be sufficiently prevented. As a result, risk of, e.g., short circuit between electrodes caused by the removed materials can increase.

Further, the following problem was also found out. That is, when a non-aqueous secondary battery separator having an adhesive porous layer is used for improving adhesion between the porous layer and the electrode active material layer formed on the current collector, the heat durability obtained thereby is insufficient as the non-aqueous secondary battery separator, and, as a whole, such a separator tends to shrink even at a temperature of 150° C. or lower. Therefore, such a separator is prone to cause battery short circuit.

Further, the non-aqueous secondary battery separator having the adhesive porous layer has a disadvantage in that, when the non-aqueous secondary battery separator is left for a long period of time in a form of a wound roll, conglutination between the separator surfaces occurs (poor anti-blocking property).

The present invention was created in the light of the aforementioned prior art. An object of the present invention is to provide a secondary battery separator having good heat durability, high adhesion property with the electrode active material layer formed on the current collector, and good anti-blocking property. A further object of the present invention is to provide a secondary battery having such a secondary battery separator.

Solution to Problem

In the light of the aforementioned circumstances, the present inventor has extensively made studies. As a result, the present inventor has conceived of forming a heat-durable layer and an adhesive layer on an organic separator layer, with a specific polymer for use as the polymer for constituting the adhesive layer, whereby a secondary battery separator having a sufficient heat durability, good adhesion property with the electrode active material layer formed on the current collector, and good anti-blocking property can be obtained. The present invention has thus completed.

That is, the present invention is to provide a secondary battery separator, a production method therefore, and use thereof that are as follows.

Aiming at solving these problems, the following are provided according to the present invention.

(1) A secondary battery separator comprising an organic separator layer, a heat-durable layer formed adjacent to at least one surface of the organic separator layer, and an adhesive layer formed on the heat-durable layer, wherein the heat-durable layer contains non-conductive particles and a binder, and the adhesive layer contains a particulate polymer having a glass transition temperature of 10 to 100° C.

(2) The secondary battery separator according to (1), wherein a thickness of the adhesive layer is 0.1 to 5 μm.

(3) The secondary battery separator according to (1) or (2), wherein the particulate polymer contains a crosslinkable monomer unit, and the content ratio of the crosslinkable monomer unit in the particulate polymer is 0.1 to 2 wt %.

(4) The secondary battery separator according to any one of (1) to (3), wherein the swelling ratio of the particulate polymer in a reference solution at 20° C. is 1.1 to 15 times, the reference solution being 1 mol/L $LiPF_6$ dissolved in a mixture solvent of ethylene carbonate (EC) and diethyl carbonate (DEC) which are mixed at a volume ratio of EC:DEC=1:2.

(5) The secondary battery separator according to any one of (1) to (4), wherein the particulate polymer contains an ethylenically unsaturated carboxylic acid monomer unit, and a content ratio of the ethylenically unsaturated carboxylic acid monomer unit in the particulate polymer is 1 to 50 wt %.

(6) A method for producing the secondary battery separator according to any one of (1) to (5), comprising: applying onto an organic separator layer a slurry for a heat-durable layer containing a non-conductive particles and a binder, and then drying the slurry, to form a heat-durable layer; and applying onto the heat-durable layer a slurry for an adhesive layer containing a particulate polymer having a glass transition temperature of 10 to 100° C., and then drying the slurry, to form an adhesive layer.

(7) A secondary battery comprising a positive electrode, a negative electrode, a separator and an electrolyte solution, wherein the separator is the secondary battery separator of any one of (1) to (5).

Advantageous Effects of Invention

Since the secondary battery separator of the present invention includes the heat-durable layer and the adhesive layer, it is excellent in all of heat durability, adhesion property and anti-blocking property. Therefore, the secondary battery including the secondary battery separator of the present invention is excellent in high-temperature cycle property and rate property. The secondary battery separator of the present invention is suitable for lithium ion secondary batteries of cylinder type. Further, according to the method for producing the secondary battery of the present invention, the secondary battery separator of the present invention can be efficiently produced.

DESCRIPTION OF EMBODIMENTS (1. Secondary Battery Separator)

The secondary battery separator of the present invention is a secondary battery separator comprising an organic separator layer, a heat-durable layer formed adjacent to at least one surface of the organic separator layer, and an adhesive layer formed on the heat-durable layer, wherein the heat-durable layer contains non-conductive particles and a binder, and the adhesive layer contains a particulate polymer having a glass transition temperature (Tg) of 10 to 100° C. In the following, detailed explanation on the organic separator layer, the heat-durable layer and the adhesive layer will be presented in this order.

(1.1. Organic Separator Layer)

As the organic separator layer for use in the present invention, a porous membrane which does not show electron conductivity but shows ion conductivity, is highly resistant to an organic solvent, and has a fine pore diameter is used. Examples thereof may include a microporous membrane made of a resin such as polyolefin resins (polyethylene, polypropylene, polybutene, and polyvinyl chloride), and a mixture or a copolymer thereof, a microporous film made of a resin such as polyethylene terephthalate, polycycloolefin, polyethersulfone, polyamide, polyimide, polyimideamide, polyaramide, polycycloolefin, nylon, and polytetrafluoroethylene, a woven material or unwoven fabric made of polyolefin fibers, and aggregate of insulating substance particles. Among them, a microporous membrane made of a polyolefin resin is preferable because coating thereon with the slurry for the heat-durable layer can be performed in an excellent manner, and the thickness of the overall secondary battery separator can be made thinner, whereby high electrode active material ratio in the battery can be obtained, and thus the capacity per volume can be increased.

The thickness of the organic separator layer is preferably 0.5 to 40 μm, more preferably 1 to 30 μm, and particularly preferably 1 to 10 μm. By setting the thickness of the organic separator layer within the aforementioned range, resistance due to the organic separator layer in the battery can be reduced, and good workability upon battery production can be achieved.

The organic separator layer for use in the present invention may include any fillers and fibrous compounds other than the non-conductive particles, for controlling strength, hardness, and heat-shrinking ratio. Further, for improving cohesiveness during formation of the heat-durable layer on the surface of the organic separator layer and for decreasing the surface tension with the electrolyte solution to improve impregnation with the solution, coating treatment with a low molecular compound or a polymer compound, treatment with electromagnetic radiation such as ultraviolet radiation, or plasma treatment by corona discharge or plasma gas may be previously performed on the surface of the organic separator layer. In particular, coating treatment with a polymer compound containing a polar group such as a carboxylic acid group, a hydroxyl group, and a sulfonic acid group is preferable since thereby high impregnation with an electrolyte solution and cohesiveness to the heat-durable layer can be easily achieved.

The organic separator layer for use in the present invention may be of a multilayer structure having 2 or more of the layers that may be used as the organic separator layers, aiming at improving anti-tearing strength and anti-piercing strength. Specific examples thereof may be a laminate of a polyethylene microporous membrane and a polypropylene microporous membrane, and a laminate of an unwoven fabric and a polyolefin separator.

(1.2. Heat-Durable Layer)

The heat-durable layer in the present invention contains non-conductive particles and a binder.

The heat-durable layer is made of the non-conductive particles that are bound via the binder, and has a structure wherein void space is formed between the non-conductive particles. This void space constitutes pores of the heat-durable layer.

(1.2.1. Non-conductive Particles)

It is desirable that the materials constituting the non-conductive particles stably exist under the environment for use in the lithium ion secondary battery and are also electrochemically stable. For example, a variety of non-electroconductive inorganic and organic particles may be used.

As the material for the inorganic particles, a material that is electrochemically stable and that is suitable for mixing with other materials such as the viscosity modifier, which will be described later, to prepare a slurry composition for the heat-durable layer is preferable. From such viewpoints, as the inorganic particles, oxides such as aluminum oxide (alumina), aluminum oxide hydrates (boehmite (AlOOH), Gibbsite (Al(OH)$_3$)), bakelite, magnesium oxide, magnesium hydroxide, iron oxide, silicon oxide, titanium oxide (titania) and calcium oxide; nitrides such as aluminum nitride and silicon nitride; silica, barium sulfate, barium fluoride and calcium fluoride may be used. Among these, oxides are preferable from the viewpoint of stability in electrolyte solution and electropotential stability. Particularly, from the viewpoint of low water absorption and good heat durability (e.g., durability against high temperature of 180° C. or more), titanium oxide, alumina, boehmite, magnesium oxide and magnesium hydroxide are preferable, and alumina, boehmite, magnesium oxide and magnesium hydroxide are particularly preferable.

As the organic particles, particles of a polymer (a polymerized product) is usually used. As to the organic particles, their affinity to water can be controlled by adjusting the type and amount of a functional group on the surface of the particles, whereby it is possible to control the moisture amount contained in the heat-durable layer of the present invention. Preferable examples of the organic materials for the non-conductive particles may include a variety of polymer compounds such as polystyrene, polyethylene, polyimide, a melamine resin, and a phenol resin. The polymer compounds forming the particles may be used even if they are a mixture, a modified form, a derivative, a random copolymer, an alternating copolymer, a graft copolymer, a block copolymer, a crosslinked form, etc. The organic particles may be formed of a mixture of two or more polymer compounds.

When the organic particles are used as the non-conductive particles, the organic particles may be those having a glass transition temperature or may be those not having a glass transition temperature. When the polymer compound forming the organic particles has the glass transition temperature, the glass transition temperature is usually 150° C. or higher, preferably 200° C. or higher, and more preferably 250° C. or higher.

If necessary, the non-conductive particles may be processed by element substitution, surface treatment, solid solution formation, etc. A single non-conductive particle may solely contain one of the aforementioned materials or may contain two or more of the aforementioned materials in combination at any ratio. Further, as the non-conductive particles, a combination of two or more types of particles formed of different materials may be used.

The average particle diameter (volume average D50 average particle diameter) of the non-conductive particles is preferably 5 nm to 10 μm, and more preferably 10 nm to 5 μm. By setting the average diameter of the non-conductive particles within the aforementioned range, the state of dispersion can be easily controlled, whereby a heat-durable layer membrane having a specific uniform thickness with reduced internal resistance can be easily obtained. It is preferable to set the average diameter of the non-conductive particles within a range of 50 nm to 2 μm because thereby dispersibility, good applicability, and good void space controllability can be achieved. The average particle diameter of the non-conductive particles in the present invention is a number average particle diameter obtained by measuring the diameters of 100 non-conductive particle images which have been selected randomly on a transmission electron microscope image and calculating an arithmetic average value.

Specifically, in order to suppress the aggregation of particles and to obtain suitable fluidity of the slurry for the heat-durable layer, the BET specific surface area of these non-conductive particles is preferably 0.9 to 200 m$^2$/g, and more preferably 1.5 to 150 m$^2$/g. The BET specific surface area of the non-conductive particles is measured by BET measurement method wherein nitrogen gas absorption on the non-conductive particles is effected using a specific surface area measurement device (Gemini 2310: manufactured by Shimadzu Corporation).

In the present invention, the shape of the non-conductive particles may be spherical shape, needle shape, rod shape, scale shape, plate shape, tetrapod (registered trademark) shape (connected particles), etc. without any particular limitation. When inorganic particles are used as the non-conductive particles, tetrapod shape (connected particles), plate shape, and scale shape are preferable. When the inorganic particles have the aforementioned shape, void ratio (porosity ratio) of the heat-durable layer is ensured, and reduction in ion conductivity can be suppressed.

The content ratio of the non-conductive particles in the heat-durable layer is preferably 70 to 97 wt %, and more preferably 80 to 95 wt %. By setting the content ratio of the non-conductive particles in the heat-durable layer within the aforementioned range, gaps between the non-conductive particles can be formed to an extent wherein the non-conductive particles have portions for contacting to each other while migration of ions is not inhibited.

(1.2.2. Binder)

The heat-durable layer in the present invention contains a binder. The binder plays a role of maintaining mechanical strength of the heat-durable layer. Usually, as the binder, a variety of materials having binding ability may be used. Examples thereof may include a conjugated diene polymer, a polymer containing an acrylic acid ester monomer unit and/or a methacrylic acid ester monomer unit (that polymer may be referred to hereinbelow as "(meth)acrylic polymer". In the present application, "(meth)acryl-" refers to acryl- and/or methacryl-.), a fluorine polymer and a silicon polymer. Among these, the conjugated diene polymer and the (meth)acrylic polymer are preferable, and the (meth)acrylic polymer is particularly preferable since they can give a heat-durable layer having capability to retain the non-conductive particles, and also having excellent flexibility, whereby a battery having stability to oxidation and reduction, and excellent lifetime property can be easily obtained.

The conjugated diene polymer is a polymer containing a conjugated diene monomer unit and its hydrogenated product. The conjugated diene monomer unit is a repeating unit obtained by polymerization of a conjugated diene monomer.

Examples of the conjugated diene monomer constituting the conjugated diene monomer unit may include 1,3-butadiene, isoprene, and chloroprene.

In addition to the conjugated diene monomer unit, the conjugated diene polymer may contain as an optional component a monomer unit of a monomer that is copolymerizable with the conjugated diene.

Examples of the monomer constituting the monomer unit that is copolymerizable with the conjugated diene may include non-conjugated diene monomers such as 1,2-butadiene; α-olefins such as ethylene, propylene and isobutylene; aromatic vinyl monomers such as styrene; and cyanovinyl monomers such as acrylonitrile and methacrylonitrile.

These copolymerizable monomers may be used solely or in combination of two or more.

Specific examples of the conjugated diene polymers may include conjugated diene homopolymers such as polybutadiene and polyisoprene; aromatic vinyl-conjugated diene copolymers such as a styrene-butadiene copolymer (SBR), styrene-butadiene-styrene block copolymer (SBS), and styrene-isoprene-styrene block copolymer (SIS), and hydrogenated products thereof; copolymers of aromatic vinyl-conjugated diene-carboxylic acid group containing monomer such as a styrene-butadiene-methacrylic acid copolymer and a styrene-butadiene-itaconic acid copolymer; a vinyl cyanide-conjugated diene copolymer such as an acrylonitrile-butadiene copolymer (NBR) and hydrogenated products thereof.

The acrylic acid ester monomer unit is a repeating unit obtained by polymerization of an acrylic acid ester monomer. The methacrylic acid ester monomer unit is a repeating unit obtained by polymerization of a methacrylic acid ester monomer.

Examples of the acrylic acid ester and/or methacrylic acid ester may include alkyl acrylates such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl methacrylates such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Among these, alkyl acrylates are preferable, and one or more selected from the group consisting of ethyl acrylate, butyl acrylate and 2-ethylhexyl acrylate are preferable, and butyl acrylate is more preferable.

The content ratio of the (meth)acrylic acid ester monomer unit in the (meth)acrylic polymer is preferably 50 to 98 wt %, more preferably 60 to 97.5 wt %, and particularly preferably 70 to 95 wt %.

It is preferable that the (meth)acrylic polymer contains, in addition to the (meth)acrylic acid ester monomer unit, a (meth)acrylonitrile monomer unit. When the (meth)acrylic polymer contains (meth)acrylonitrile monomer unit and (meth)acrylic acid ester monomer unit, a battery that is stable to oxidization and reduction and has a long lifetime can be obtained. By using (meth)acrylic polymer containing such repeating units as the binder, flexibility of the heat-durable layer is improved, and thereby removal of the non-conductive particles from the heat-durable layer upon cutting (slit) processing and upon winding can be reduced.

The (meth)acrylonitrile monomer unit is a repeating unit obtained by polymerization of (meth)acrylonitrile. As the (meth)acrylonitrile monomer unit, the binder may solely contain the acrylonitrile monomer unit, may solely contain the methacrylonitrile monomer unit, or may contain both the acrylonitrile monomer unit and the methacrylonitrile monomer unit in combination at any ratio.

In the present invention, ratio of the (meth)acrylonitrile monomer unit and the (meth)acrylic acid ester monomer unit (=(meth)acrylonitrile monomer unit/(meth)acrylic acid ester monomer unit) in the (meth)acrylic polymer in weight ratio is preferably within a range of 1/99 to 30/70, and more preferably within a range of 5/95 to 25/75. When the ratio of the (meth)acrylonitrile monomer unit in the (meth)acrylic polymer is equal to or more than the aforementioned lower limit, the binder swells in the electrolyte solution, whereby decrease in ion conductivity can be prevented, and decrease in rate property can be suppressed. When the ratio is equal to or less than the aforementioned upper limit, decrease in strength of the heat-durable layer due to decrease in strength of the binder can be prevented. Usually, the ratio of the (meth)acrylonitrile monomer unit and the (meth)acrylic acid ester monomer unit in the binder is the same as the ratio of the (meth)acrylonitrile monomer and the (meth)acrylic acid ester monomer in all monomers used for producing the binder (charging amount ratio).

It is preferable that, in addition to the (meth)acrylic acid ester monomer unit and the (meth)acrylonitrile monomer unit, the (meth)acrylic polymer contains an optional monomer unit.

Examples of such an optional monomer unit may include a vinyl monomer unit having an acidic group, and a monomer unit having a crosslinkable group.

Examples of the vinyl monomer having an acidic group may include a monomer having a —COOH group (carboxylic acid group), a monomer having an —OH group (hydroxyl group), a monomer having a —SO$_3$H group (sulfonic acid group), a monomer having a —PO$_3$H$_2$ group, a monomer having a —PO(OH) (OR) group (wherein R represents a hydrocarbon group), and a monomer having a lower polyoxyalkylene group. Further, an acid anhydride which generates a carboxylic acid group by hydrolysis may also be similarly used.

Examples of the monomer having a carboxylic acid group may include a monocarboxylic acid, a dicarboxylic acid, an anhydride of dicarboxylic acid, and derivatives thereof. Examples of the monocarboxylic acid may include acrylic acid, methacrylic acid, crotonic acid, 2-ethylacrylic acid, and isocrotonic acid. Examples of the dicarboxylic acid may include maleic acid, fumaric acid, itaconic acid, and methylmaleic acid. Examples of the acid anhydride of dicarboxylic acid may include maleic anhydride, acrylic anhydride, methylmaleic anhydride, and dimethylmaleic anhydride.

Examples of the monomer having a hydroxyl group may include ethylenically unsaturated alcohol such as (meth)allyl alcohol, 3-buten-1-ol, and 5-hexen-1-ol; alkanol esters of ethylenically unsaturated carboxylic acid such as 2-hydroxyethyl acrylate, 2-hydroxypropyl acrylate, and 2-hydroxyethyl methacrylate; esters of polyalkylene glycol and (meth)acrylic acid represented by a generic formula $CH_2=CR^1—COO—(C_nH_{2n}O)m-H$ (wherein m is an integer of 2 to 9, n is an integer of 2 to 4, [[R]]$R^1$ represents hydrogen or a methyl group); mono(meth)acrylic acid ester including dihydroxy ester of dicarboxylic acid such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; alkylene glycol mono(meth)allyl ethers such as (meth)allyl 2-hydroxyethyl ether, (meth)allyl 2-hydroxypropyl ether, and (meth)allyl 3-hydroxypropyl ether; polyoxyalkylene glycol mono(meth)allyl ethers such as diethylene gylcol mono(meth)allyl ether and dipropylene gylcol mono(meth)allyl ether; mono(meth)allyl ethers of halogen and hydroxy substitution product of (poly)alkylene glycol such as glycerol mono(meth)allyl ether, (meth)allyl 2-chloro-3-hydroxylpropyl ether, and (meth)allyl 2-hydroxy-3-chloropropyl ether; mono(meth)allyl ethers of polyhydric phenol such as eugenol and isoeugenol, and a halogen substitution product thereof; and alkylene glycol(meth)allyl thioethers such as (meth)allyl 2-hydroxyethyl thioether and (meth)allyl 2-hydroxypropyl thioether.

Examples of the monomer having a sulfonic acid group may include vinylsulfonic acid, methylvinylsulfonic acid, (meth)allylsulfonic acid, styrenesulfonic acid, ethyl(meth)acrylate-2-sulfonate, 2-acrylamide-2-methylpropanesulfonic acid, and 3-allyloxy-2-hydroxypropanesulfonic acid.

Examples of the monomer having a —$PO_3H_2$ group and/or a —PO(OH) (OR) group (wherein R represents a hydrocarbon group) may include 2-(meth)acryloyloxyethyl phosphate, methyl 2-(meth)acryloyloxyethyl phosphate, and ethyl(meth)acryloyloxyethyl phosphate.

Examples of the monomer having a lower polyoxyalkylene group may include poly(alkylene oxide) such as poly(ethylene oxide).

Among them, the monomer having a carboxylic acid group is preferable as the vinyl monomer having an acidic group since it brings about excellent cohesiveness to the organic separator layer and it efficiently captures transition metal ions eluted from a positive electrode active material. In particular, monocarboxylic acid having a carboxylic acid group and five or less carbon atoms such as acrylic acid and methacrylic acid, and dicarboxylic acid having two carboxylic acid groups and five or less carbon atoms such as maleic acid and itaconic acid are preferable. Further, acrylic acid, methacrylic acid and itaconic acid are preferable from the viewpoint of high preservation stability of the slurry preparation for the heat-durable layer.

The content ratio of the vinyl monomer unit having an acidic group in the (meth)acrylic polymer is preferably 1 to 3 wt %, and more preferably 1.5 to 2.5 wt %.

The crosslinkable monomer unit is a structural unit obtained by polymerization of a crosslinkable monomer. The crosslinkable monomer is a monomer that is capable of forming a crosslink structure during or after polymerization by heating or energy ray irradiation. Examples of the crosslinkable monomer may usually include a monomer having thermal crosslinkability. Specific examples thereof may include monofunctional crosslinkable monomers having a thermally crosslinkable group and one olefinic double bond per molecule; and polyfunctional crosslinkable monomers having two or more olefinic double bonds per molecule.

Examples of the thermally crosslinkable group may include an epoxy group, an N-methylolamide group, an oxetanyl group, an oxazoline group, and a combination thereof. Among these, an epoxy group is more preferable for facilitating adjustment of crosslinking and crosslink density.

Examples of the crosslinkable monomer having an epoxy group as the thermally crosslinkable group and an olefinic double bond may include unsaturated glycidyl ethers such as vinyl glycidyl ether, allyl glycidyl ether, butenyl glycidyl ether, and o-allylphenyl glycidyl ether; monoepoxides of diene or polyene such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of an unsaturated carboxylic acid such as glycidyl acrylate, glycidyl methacrylate, glycidyl crotonate, glycidyl 4-heptenoate, glycidyl sorbate, glycidyl linoleate, glycidyl 4-methyl-3-pentenoate, a glycidyl ester of 3-cyclohexenecarboxylic acid, and a glycidyl ester of 4-methyl-3-cyclohexenecarboxylic acid.

Examples of the crosslinkable monomer having an N-methylolamide group as the thermally crosslinkable group and an olefinic double bond may include (meth)acrylamides having a methylol group such as N-methylol (meth)acrylamide.

Examples of the crosslinkable monomer having an oxetanyl group as the thermally crosslinkable group and an olefinic double bond may include 3-((meth)acryloyloxymethyl)oxetane, 3-((meth)acryloyloxymethyl)-2-trifluoromethyl oxetane, 3-((meth)acryloyloxymethyl)-2-phenyl oxetane, 2-((meth)acryloyloxymethyl)oxetane, and 2-((meth)acryloyloxymethyl)-4-trifluoromethyl oxetane.

Examples of the crosslinkable monomer having an oxazoline group as the thermally crosslinkable group and an olefinic double bond may include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of the crosslinkable monomer having two or more olefinic double bonds per molecule may include allyl (meth)acrylate, ethylene di(meth)acrylate, diethylene glycol di(meth)acrylate, triethylene glycol di(meth)acrylate, tetraethylene glycol di(meth)acrylate, trimethylolpropane tri(meth)acrylate, dipropylene glycol diallyl ether, polyglycol diallyl ether, triethylene glycol divinyl ether, hydroquinone diallyl ether, tetraallyloxyethane, trimethylolpropane diallyl ether, other allyl or vinyl ethers of polyfunctional alcohol, triallylamine, methylenebisacrylamide, and divinylbenzene.

Among these, N-methylol(meth)acrylamide, allyl(meth)acrylate, ethylene dimethacrylate, allyl glycidyl ether, and glycidyl methacrylate are particularly preferable as the crosslinkable monomer.

As the crosslinkable monomer, one type of the aforementioned crosslinkable monomer may be solely used, or two or more types thereof may be used in combination at any ratio.

The content ratio of the crosslinkable monomer unit in the (meth)acrylic polymer is preferably 0.1 to 10 wt %, and more preferably 0.1 to 5 wt %. By setting the content ratio of the crosslinkable monomer unit in the (meth)acrylic polymer within the aforementioned range, deformation of the heat-durable layer due to elution of the (meth)acrylic polymer into an electrolyte solution can be suppressed, to thereby improve cycle property of the secondary battery.

The (meth)acrylic polymer that is suitably used in the present invention may include, in addition to the unit of the aforementioned monomers, a unit of monomers that are copolymerizable therewith. Examples of the monomer copolymerizable therewith may include a halogen atom-containing monomer such as vinyl chloride and vinylidene chloride; vinyl esters such as vinyl acetate, vinyl propionate, and vinyl butyrate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; a heterocycle ring-containing vinyl compound such as N-vinylpyrrolidone, vinyl pyridine, and vinyl imidazole; and acrylamide.

The content ratio of the copolymerizable monomer unit in the (meth)acrylic polymer is preferably 0.1 to 30 wt %, and more preferably 0.1 to 20 wt %. When the content amount of the copolymerizable monomer unit is within the aforementioned range, the slurry for the heat-durable layer, which will be described later, acquires excellent stability over the lapse of time. Further, the secondary battery having the heat-durable layer containing as the binder the (meth)acrylic polymer can have excellent cycle property and rate property.

There is no particular limitation imposed on the method for producing the binder. As the production method, any method such as a solution polymerization method, a suspension polymerization method, and an emulsion polymerization method may be used. Among these, the emulsion polymerization method and the suspension polymerization method are preferable because polymerization can be effected in water and the product as it is can be used as the material for the slurry for the heat-durable layer.

Although there is no particular limitation imposed on the manner of initiating polymerization, it is preferable to use a polymerization initiator. Examples of the polymerization initiator for use in polymerization may include: organic peroxides such as lauroyl peroxide, diisopropyl peroxydicarbonate, di-2-ethylhexyl peroxydicarbonate, t-butyl peroxypivalate, and 3,3,5-trimethylhexanoyl peroxide; azo compounds such as $\alpha,\alpha'$-azobisisobutyronitrile; ammonium persulfate; and potassium persulfate. The using amount of the polymerization initiator is preferably within a range of 0.01 to 10 parts by weight with respect to 100 parts by weight of the monomers for producing the binder, although not limited thereto.

Upon producing the binder, it is preferable that the reaction system therefore contains a dispersing agent. As the dispersing agent, those that are used in ordinary synthesis may be used. Specific examples thereof may include: benzenesulfonates such as sodium dodecylbenzenesulfonate and sodium dodecyl phenyl ether sulfonate; alkyl sulfates such as sodium laurylsulfate and sodium tetradecylsulfate; sulfosuccinates such as sodium dioctylsulfosuccinate and sodium dihexylsulfosuccinate; fatty acid salts such as sodium laurate; ethoxy sulfates such as sodium polyoxyethylene lauryl ether sulfate and sodium polyoxyethylene nonylphenyl ether sulfate; alkane sulfonates; sodium alkyl ether phosphates; nonionic emulsifiers such as polyoxyethylene nonylphenyl ether, polyoxyethylene sorbitan lauryl ester, and a polyoxyethylene-polyoxypropylene block copolymer; and water-soluble polymers such as gelatin, a maleic anhydride-styrene copolymer, polyvinylpyrrolidone, sodium polyacrylate, and polyvinyl alcohol having a degree of polymerization of 700 or more and a degree of saponification of 75% or more. One type thereof may be solely used, or two or more thereof may be used in combination at any ratio. Among these, benzenesulfonates such as sodium dodecylbenzenesulfonate and sodium dodecyl phenyl ether sulfonate; and alkyl sulfates such as sodium laurylsulfate and sodium tetradecylsulfate are preferable. Further, benzenesulfonates such as sodium dodecylbenzenesulfonate and sodium dodecyl phenyl ether sulfonate are more preferable because of excellent oxidation resistance. The amount of the dispersing agent may be optionally set, and is preferably about 0.01 to 10 parts by weight with respect to 100 parts by weight of total monomer amount.

The weight average molecular weight of the binder may be appropriately selected depending on intended use, and is preferably 10,000 to 500,000, and more preferably 20,000 to 200,000 as the weight average molecular weight (Mw) in terms of polystyrene measured by gel permeation chromatography of a cyclohexane solution (when the polymer is not dissolved therein, a toluene solution). When the weight average molecular weight of the binder is within the aforementioned range, strength of the heat-durable layer and dispersibility of the non-conductive particles can be easily set to preferable state.

Usually, binder is prepared and stored as a dispersion liquid in a state of being dispersed in a dispersion medium (water or an organic solvent), and the dispersion liquid is used as a material in the production of the slurry for the heat-durable layer. In the present invention, it is preferable to use water as the dispersion medium from the viewpoint of low environmental load and rapid drying speed. When an organic solvent is used as the dispersion medium, an organic solvent such as N-methylpyrrolidone (NMP) is used.

When the binder is dispersed in the dispersion medium in a form of particles, the volume average particle diameter D50 of the binder dispersed in a form of particles is preferably 0.01 to 0.7 µm, and more preferably 0.01 to 0.5 µm. When the volume average particle diameter D50 of the binder is equal to or more than the aforementioned lower limit, porosity of the heat-durable layer in the present invention can be kept at a high level, to suppress resistance of the heat-durable layer, whereby the battery properties are kept in a good state. When the volume average particle diameter D50 of the binder is equal to or less than the aforementioned upper limit, a large number of adhesion points between the non-conductive particles and the binder can be ensured, to obtain high binding property. The volume average particle diameter D50 of the binder is obtained by measuring the dispersed particle diameter of the binder in the dispersion medium using a laser diffraction particle size distribution measurement device.

When the binder is dispersed in a form of particles in a dispersion medium, the solid content concentration of the dispersion liquid is preferably 15 to 70 wt %, more preferably 20 to 65 wt %, and still more preferably 30 to 60 wt %. When the solid content concentration is within this range, good workability can be achieved upon producing the slurry for the heat-durable layer, which will be described later.

The glass transition temperature (Tg) of the binder is preferably −50 to 20° C., more preferably −40 to 15° C., and particularly preferably −30 to 5° C. When the glass transition temperature (Tg) is within the aforementioned range, flexibility of the heat-durable layer of the present invention can be improved, and bending resistance of the organic separator layer can be improved. Accordingly, ratio of defectiveness caused by breakage of the heat-durable layer can be lowered. In addition, the secondary battery separator of the present invention can also be prevented from cracking and chipping when wrapped around a roll or wound up. The glass transition temperature (Tg) of the binder may be adjusted by combining a variety of monomers.

The content amount of the binder in the heat-durable layer is preferably 0.1 to 20 parts by weight, more preferably 0.2 to 15 parts by weight, and particularly preferably 0.5 to 10 parts by weight, with respect to 100 parts by weight of the non-conductive particles. By setting the amount of the binder within the aforementioned range, cohesiveness between the heat-durable layer and the organic separator layer can be improved and internal resistance reduction can be expected.

In the secondary battery separator of the present invention, among the heat-durable layer and the adhesive layer, only the heat-durable layer may contain the non-conductive particles. Alternatively, the ratio of the non-conductive particles in the heat-durable layer may be higher than the ratio of the non-conductive particles in the adhesive layer. By having such a higher ratio of the non-conductive particles in the heat-durable layer than that in the adhesive layer, the heat-durable layer can have higher void ratio than that of the adhesive layer. As a result, increase in Gurley value increasing ratio can be reduced.

(1.2.3. Other Optional Components)

The heat-durable layer may further contain, in addition to the aforementioned components, an optional component. Examples of such an optional component may include a viscosity modifier, surfactant, a defoaming agent, and an electrolyte additive having a function of, e.g., inhibiting decomposition of an electrolyte solution. There is no particular limitation imposed on the optional component as long as it does not cause unfavorable effect to an excessive degree on the battery reaction in the secondary battery wherein the secondary battery separator of the present invention is used. These components include components added for improving stability of the slurry for the heat-durable layer, which will be described later, and components added for improving battery properties. The types of the optional components may be one, or may be two or more.

Examples of the viscosity modifier may include cellulose derivatives such as carboxymethyl cellulose (CMC); poly (meth)acrylic acid salts such as sodium poly(meth)acrylate; polyvinyl alcohol, modified polyvinyl alcohol, and polyethylene oxide; polyvinylpyrrolidone, polycarboxylic acid, oxidized starch, starch phosphate, casein, various modified starches, and chitin and chitosan derivatives. Among these, cellulose derivatives are particularly preferable.

The cellulose derivative is a compound obtained by etherification or esterification of at least a part of hydroxyl groups of cellulose. As the cellulose derivative, water-soluble ones are preferable. A cellulose derivative usually does not have a glass transition temperature. Examples thereof may include carboxymethyl cellulose, carboxymethylethyl cellulose, methyl cellulose, ethyl cellulose, ethylhydroxyethyl cellulose, hydroxyethyl cellulose, and hydroxypropyl cellulose. Examples may also include ammonium salts and alkali metal salts thereof. Among these, salts of carboxymethyl cellulose are preferable, and ammonium salt of carboxymethyl cellulose is particularly preferable. Etherification ratio of the cellulose derivative is preferably 0.5 to 2, and more preferably 0.5 to 1.5. Etherification ratio herein refers to a value representing the average number of the etherified hydroxyl group among three hydroxyl groups per glucose unit in cellulose. When the etherification ratio is within this range, the slurry for the heat-durable layer can have high stability and low tendency to cause sedimentation or aggregation of solid content. Further, use of the cellulose derivative improves applicability and fluidity of the paint.

The viscosity of the viscosity modifier at the solid content concentration of 1% is preferably 10 to 8,000 mPa·s. By using the viscosity modifier having a viscosity within this range, an excellent uniform applicability of the slurry for the heat-durable layer, which will be described later, can be obtained, and excellent high-speed applicability and stability over the lapse of time of the slurry for the heat-durable layer can also be obtained. Accordingly, thickness of the heat-durable layer can be reduced, and thus the ion conductivity of the secondary battery separator and rate property of the secondary battery can be further improved. The viscosity of the viscosity modifier at the solid content concentration of 1% is a value measured by a B-type viscometer at 25° C. and a rotation speed of 60 rpm after 60 minutes.

The amount of the viscosity modifier in the heat-durable layer is preferably 0.01 to 5 parts by weight, more preferably 0.05 to 4 parts by weight, and particularly preferably 0.05 to 3 parts by weight, with respect to 100 parts by weight of the non-conductive particles. By setting the content amount of the viscosity modifier in the heat-durable layer within the aforementioned range, flexibility and strength of the resulting heat-durable layer can be further improved.

Examples of the surfactant may include an anionic surfactant, a nonionic surfactant, a cationic surfactant, and an amphoteric surfactant.

The content amount of the surfactant in the heat-durable layer may preferably be within a range that does not affect battery properties. Specifically, the content amount of the surfactant is preferably 0.01 to 3 parts by weight, more preferably 0.03 to 1.5 parts by weight, and particularly preferably 0.05 to 1 parts by weight with respect to 100 parts by weight of non-conductive particles. Particularly when the slurry for the heat-durable layer is applied to the organic separator layer, by setting the using amount of the surfactant within the aforementioned range, permeability of the slurry for the heat-durable layer to the organic separator layer can be adjusted to a degree in a suitable range, whereby wettability of the organic separator layer with the slurry for the heat-durable layer can be further improved.

Examples of other additives may include nanoparticles such as fumed silica and fumed alumina. By adding the nanoparticles, the thixotropy of the slurry for the heat-durable layer can be controlled, and the leveling property of the resulting heat-durable layer can thereby be improved.

(1.3. Adhesive Layer)

The adhesive layer in the present invention contains a particulate polymer having a glass transition temperature (Tg) of 10 to 100° C. If necessary, the adhesive layer may also contain those that are contained in the heat-durable layer, such as the non-conductive particles.

The adhesive layer has void space to a suitable extent as it is formed of the particulate polymer. Since the void space keeps electrolyte (liquid electrolyte or gel electrolyte), permeability of the lithium ion can be maintained, whereby a lithium ion secondary battery with suppressed output decrease can be obtained.

(1.3.1. Particulate Polymer)

Examples of polymers constituting the particulate polymer may include conjugated diene polymers, urethane polymers and (meth)acrylic polymers. Among these, (meth) acrylic polymer is preferable from the viewpoint of high adhesion property and appropriate swelling ratio in the electrolyte solution.

The (meth)acrylic polymer is a polymer containing an acrylic acid ester monomer unit and/or methacrylic acid ester monomer unit.

The acrylic acid ester monomer unit is a repeating unit obtained by polymerization of an acrylic acid ester monomer. The methacrylic acid ester monomer unit is a repeating unit obtained by polymerization of a methacrylic acid ester monomer.

Examples of the acrylic acid ester and/or the methacrylic acid ester may include those that are the same as those in the description for the binder for constituting the heat-durable layer. Among them, from the viewpoint of adhesion property and glass transition temperature (Tg), ethyl acrylate, methyl acrylate and butyl acrylate are preferable. Ethyl acrylate and methyl acrylate are more preferable, and ethyl acrylate is particularly preferable.

The content ratio of the (meth)acrylic acid ester monomer unit in the (meth)acrylic polymer is preferably 1 to 95 wt %, more preferably 5 to 90 wt %, and particularly preferably 10 to 85 wt %. When the ratio of the (meth)acrylic acid ester monomer unit in the (meth)acrylic polymer is within the aforementioned range, swellability in the electrolyte solution and ion conductivity can be appropriately kept, while cohesiveness to the electrode can be improved.

It is preferable that the particulate polymer for use in the present invention contains a crosslinkable monomer unit. When the particulate polymer contains the crosslinkable monomer unit, swellability in the electrolyte solution and ion conductivity can be appropriately kept, while cohesiveness to the electrode active material layer can also be maintained.

The crosslinkable monomer unit is a structural unit obtained by polymerization of a crosslinkable monomer. Examples of the crosslinkable monomer may include those that are the same as those in the description for the binder for constituting the heat-durable layer.

Among them, as the crosslinkable monomer, ethylene dimethacrylate, allyl glycidyl ether and glycidyl methacrylate are preferable for facilitating adjustment of crosslinking and crosslink density.

The content ratio of the crosslinkable monomer unit in the particulate polymer is preferably 0.01 to 5 wt %, more preferably 0.05 to 4 wt %, and particularly preferably 0.05 to 3 wt %. When the content ratio of the crosslinkable monomer unit in the particulate polymer is within the aforementioned range, swellability in the electrolyte solution and ion conductivity can be appropriately kept, while cohesiveness to the electrode can also be maintained.

It is preferable that the particulate polymer for use in the present invention contains an ethylenically unsaturated carboxylic acid monomer unit. When the particulate polymer contains the ethylenically unsaturated carboxylic acid monomer unit, adhesion property to the electrode active material layer can be improved.

The ethylenically unsaturated carboxylic acid monomer unit is a repeating unit obtained by polymerization of an ethylenically unsaturated carboxylic acid monomer.

Examples of the ethylenically unsaturated carboxylic acid monomer may include a monocarboxylic acid, a dicarboxylic acid, and an anhydride of dicarboxylic acid. Examples of the monocarboxylic acid may include acrylic acid, methacrylic acid, crotonic acid, 2-ethylacrylic acid, and isocrotonic acid. Examples of the dicarboxylic acid may include maleic acid, fumaric acid, itaconic acid, and methylmaleic acid. Among these, methacrylic acid and acrylic acid are preferable, and methacrylic acid is more preferable from the viewpoint of copolymerizability. As the ethylenically unsaturated carboxylic acid monomer, one type thereof may be solely used, or two or more types thereof may be used in combination at any ratio.

The content ratio of the ethylenically unsaturated carboxylic acid monomer unit in the particulate polymer is preferably 0.1 to 95 wt %, more preferably 0.5 to 75 wt %, and particularly preferably 1 to 50 wt %. When the content ratio of the ethylenically unsaturated carboxylic acid monomer unit in the particulate polymer is within the aforementioned range, cohesiveness with the organic separator layer and adhesion property with the electrode active material layer can be further improved.

The particulate polymer for use in the present invention may contain, in addition to the aforementioned monomer unit, an optional monomer unit.

Examples of such an optional monomer unit may include an aromatic vinyl monomer unit, and (meth)acrylonitrile monomer unit.

The aromatic vinyl monomer unit is a repeating unit obtained by polymerization of an aromatic vinyl monomer.

Examples of the aromatic vinyl monomer may include styrene, α-methylstyrene, vinyltoluene, and divinylbenzene. Among these, styrene is preferable. As the aromatic vinyl monomer, one type thereof may be solely used, or two or more thereof may be used in combination at any ratio.

The content ratio of the aromatic vinyl monomer unit in the particulate polymer is preferably 0.1 to 95 wt %, more preferably 0.5 to 90 wt %, and particularly preferably 1 to 85 wt %. When the content ratio of the aromatic vinyl monomer unit in the particulate polymer is within the aforementioned range, adhesion property with the electrode active material layer and anti-blocking property can be further improved.

The (meth)acrylonitrile monomer unit is a repeating unit obtained by polymerization of (meth)acrylonitrile monomer.

Examples of the (meth)acrylonitrile monomer may include those that are the same as those in the description for the binder for constituting the heat-durable layer.

The content ratio of the (meth)acrylonitrile monomer unit in the particulate polymer is preferably 0.1 to 95 wt %, more preferably 0.5 to 90 wt %, and particularly preferably 1 to 85 wt %. When the content ratio of the (meth)acrylonitrile monomer unit in the particulate polymer is within the aforementioned range, adhesion property with the electrode active material layer and anti-blocking property can be further improved.

When the (meth)acrylic polymer that is suitable as the particulate polymer is used in the present invention, it is more preferable to use any of the following: (1) a (meth) acrylic polymer containing a (meth)acrylic acid ester monomer unit, an ethylenically unsaturated carboxylic acid monomer unit, and a crosslinkable monomer unit; (2) a (meth) acrylic polymer containing a (meth)acrylic acid ester monomer unit, a (meth)acrylonitrile monomer unit, an ethylenically unsaturated carboxylic acid monomer unit, and a crosslinkable monomer unit; and (3) a (meth)acrylic polymer containing a (meth)acrylic acid ester monomer unit, an ethylenically unsaturated carboxylic acid monomer unit, an aromatic vinyl monomer unit, and a crosslinkable monomer unit. It is more preferable to use a (meth)acrylic polymer containing a (meth)acrylic acid ester monomer unit, an ethylenically unsaturated carboxylic acid monomer unit, and a crosslinkable monomer unit, or a (meth)acrylic polymer containing a (meth)acrylic acid ester monomer unit, an ethylenically unsaturated carboxylic acid monomer unit, an aromatic vinyl monomer unit, and a crosslinkable monomer unit.

The glass transition temperature (Tg) of the particulate polymer for use in the present invention is 10 to 100° C., preferably 20 to 90° C., and more preferably 30 to 80° C. When the glass transition temperature of the particulate polymer is within the aforementioned range, binding property between the electrode active material layer and the heat-durable layer upon performing heat pressing in the process of electrode production, and anti-blocking property upon storing the secondary battery separator can be improved.

As the particulate polymer in the present invention, in addition to the particulate polymer having a glass transition temperature (Tg) of 10 to 100° C., a particulate polymer having a glass transition temperature (Tg) of −50 to 10° C. may further be used. By using the particulate polymer having a glass transition temperature (Tg) of −50 to 10° C., removal of the particulate polymer having a glass transition temperature (Tg) of 10 to 100° C. from the adhesive layer (powder falling) can be prevented.

The glass transition temperature of the particulate polymer may be adjusted within the aforementioned range by adjusting the types of the monomer units constituting the particulate polymer and their ratio.

The volume average particle diameter D50 of the particulate polymer is preferably 0.01 to 2 µm, more preferably 0.05 to 1.5 µm, and particularly preferably 0.1 to 1 µm. When the average particle diameter of the particulate polymer is within the aforementioned range, good dispersibility of the particulate polymer upon forming the adhesive layer, good applicability of the adhesive layer slurry, and good void space controllability of the resulting adhesive layer can be achieved. The volume average particle diameter D50 of the particulate polymer may be measured and determined by the same method for the binder constituting the heat-durable layer.

The swelling ratio of the particulate polymer in the reference solution, which will be described later, is preferably 1.1 to 15 times, more preferably 1.2 to 10 times, and particularly preferably 1.5 to 8 times.

As the index of the swelling ratio, values measured using a reference solution is herein employed. The reference solution in the present application is a solution wherein $LiPF_6$ is dissolved at a concentration of 1 mol/L in a mixture solvent of ethylene carbonate (EC) and diethyl carbonate (DEC) that are mixed at a volume ratio of EC:DEC=1:2. The reference solution typifies an electrolyte solution for use in a general secondary battery.

In the present invention, a swelling ratio of a certain material in the reference solution refers to a degree of swelling of the material when the material is immersed in the reference solution. Specifically, measurement of the swelling ratio of the particulate polymer in the reference solution may be performed in accordance with the operation that was performed in Examples of the present application.

By setting the swelling ratio of the particulate polymer in the reference solution within the aforementioned range, adhesion property between the secondary battery separator and the electrode active material layer can be maintained while existence of the void space for keeping the electrolyte solution can be ensured. Accordingly, cycle property and output property of the secondary battery can be further improved.

The swelling ratio of the particulate polymer may be adjusted within the aforementioned range by adjusting the types of all of the monomer units constituting the particulate polymer and their ratio. In the case of (meth)acrylic acid ester polymer units, an example of the adjustment method may be adjustment of, e.g., the length of the alkyl chain bound to the non-carbonyl oxygen atom of the polymer unit.

The swelling ratio of the particulate polymer may be adjusted within the aforementioned range by selecting the types of all of the monomer units constituting the particulate polymer and their ratio. As the index thereof, a solubility parameter (which may be referred to hereinbelow as "SP value") of the particulate polymer may be used. For example, a method wherein a polymer or a copolymer having the SP value of preferably 8 to 13 $(cal/cm^3)^{1/2}$, more preferably 9 to 12 $(cal/cm^3)^{1/2}$ is used as the particulate polymer may be exemplified.

The solubility parameter may be determined by the method described in E. H. Immergut ed., "Polymer Handbook" VII Solubility Parameter Values, pp 519-559 (John Wiley & Sons, 3rd edition, issued in 1989). The solubility parameter of a material that is not described in this document may be determined in accordance with a "molecular attraction constant method" proposed by Small. In this method, the SP value (δ) is determined from the following formula using the characteristic values of the functional groups (atomic groups) constituting the compound molecule, i.e., the sum of molecular attraction constants (G), the molecular weight (w), and the specific gravity (d):

$$\delta = \Sigma G/V = d\Sigma G/M (V; \text{specific volume}, M; \text{molecular weight}, d; \text{specific gravity})$$

The method for producing the particulate polymer is not particularly limited, and the method that is the same as the production method for the binder of the heat-durable layer may be used. That is, any methods such as a solution polymerization method, a suspension polymerization method, and an emulsion polymerization method may be used. Among these, the emulsion polymerization method and the suspension polymerization method are preferable because polymerization can be effected in water and the product as it is can be used as the material for the slurry for the adhesive layer. As the polymerization initiator and dispersing agent for use in the production of the particulate polymer, those that are the same as those in the description of the production method for the binder of the heat-durable layer may be used.

Then content ratio of the particulate polymer having a glass transition temperature (Tg) of 10 to 100° C. in the adhesive layer is preferably 50 to 100 wt %, and more preferably 60 to 100 wt %. By setting the content ratio of the particulate polymer in the adhesive layer within the aforementioned range, advantages such as suitable extent of void space in the adhesive layer, and maintenance of adhesion property to the electrode active material layer can be achieved.

(1.3.2. Other Optional Components)

The adhesive layer may further contain, in addition to the aforementioned components, an optional component. Examples of such an optional component may include an electrolyte additive having a function of, e.g., protection of the electrode active material layer. There is no particular limitation imposed on the optional component as long as it does not cause unfavorable effect to an excessive degree on the battery reaction in the secondary battery wherein the secondary battery separator of the present invention is used, and may include the binder and the non-conductive particles that are used for the heat-durable layer. These components include components added for improving stability of the slurry for the adhesive layer, which will be described later, and components added for improving battery properties. The types of the optional components may be one, or may be two or more. The content ratio of the optional components in the adhesive layer is preferably 10 wt % or less, and more preferably 5 wt % or less.

The ratio of the non-conductive particles in the adhesive layer is 0 to 40 wt %, and preferably 10 to 20 wt %. By setting the ratio of the non-conductive particles and the particulate polymer in the adhesive layer within the aforementioned range, high adhesion property to the electrode and heat durability can be maintained.

(2. Method for Producing Secondary Battery Separator)

There is no particular limitation imposed on the method for producing the secondary battery separator of the present invention as long as the method forms the heat-durable layer and the adhesive layer in this order on the organic separator layer. A preferable method includes: a step of applying onto an organic separator layer a slurry for a heat-durable layer containing a non-conductive particles and a binder, and then drying the slurry, to form a heat-durable layer; and a step of applying onto the heat-durable layer a slurry for an adhesive layer containing a particulate polymer having a glass transition temperature (Tg) of 10 to 100° C., and then drying the slurry, to form an adhesive layer. In the following, this method will be explained as the method for producing the secondary battery separator of the present invention.

(2.1. Method for Forming Heat-Durable Layer)

In the production method of the present invention, firstly, a slurry for a heat-durable layer containing a non-conductive particles and a binder is applied onto an organic separator layer, and then the slurry is dried, to form a heat-durable layer.

The slurry for the heat-durable layer is produced by mixing a dispersion medium, and the aforementioned solid contents that are the non-conductive particles, the binder, and the optional components.

In the present invention, by using the aforementioned components, a slurry for the heat-durable layer in which the non-conductive particles are highly dispersed can be obtained regardless of the mixing method and the order for mixing.

There is no particular limitation imposed on the dispersion medium as long as the dispersion medium has an ability to achieve uniform dispersion of the aforementioned solid contents (the non-conductive particles, the binder, and the aforementioned optional components).

As the dispersion medium for the slurry for the heat-durable layer, any of water and organic solvents may be used. Examples of the organic solvent may include alicyclic hydrocarbons such as cyclopentane and cyclohexane; aromatic hydrocarbons such as toluene, xylene and ethylbenzene; ketones such as acetone, ethyl methyl ketone, diisopropyl ketone, cyclohexanone, methylcyclohexane, and ethylcyclohexane; chlorinated aliphatic hydrocarbons such as methylene chloride, chloroform, and carbon tetrachloride; esters such as ethyl acetate, butyl acetate, γ-butyrolactone, and ε-caprolactone; acrylonitriles such as acetonitrile and propionitrile; ethers such as tetrahydrofuran and ethylene glycol diethyl ether; alcohols such as methanol, ethanol, isopropanol, ethylene glycol, and ethylene gylcol monomethyl ether; and amides such as N-methylpyrrolidone and N,N-dimethylformamide.

Any of these dispersion medium may be solely used, or two or more thereof may be mixed and used as a mixture dispersion medium. Among these, a dispersion medium that has good dispersibility of the non-conductive particles, and has low boiling point and high volatility is particularly preferable since such a dispersion medium can be removed for a short period of time at a low temperature. Specifically, acetone, toluene, cyclohexanone, cyclopentane, tetrahydrofuran, cyclohexane, xylene, water, or N-methylpyrrolidone, or dispersion media that are mixture of these media is preferable.

In particular, when the aforementioned (meth)acrylic polymer is used as the binder, it is preferable that a water-based dispersion medium such as water is used as a dispersion medium to obtain the slurry for the heat-durable layer as an aqueous dispersion, since thereby manufacturing processes and process load can be reduced.

The solid content concentration of the slurry for the heat-durable layer may be appropriately adjusted to the concentration of a degree which allows application of the slurry for the heat-durable layer and attains viscosity allowing fluidity. The solid content concentration may be generally about 10% to 50 wt %.

The components other than the solid content are those that are to be volatilized by the drying step and include, in addition to the aforementioned dispersion medium, e.g., a medium in which the non-conductive particles and the binder have been dissolved or dispersed in preparation and addition thereof.

Since the slurry for the heat-durable layer is for forming the heat-durable layer, content ratio of the non-conductive particles, the binder and the optional components (the components mentioned in the above as the optional components for the heat-durable layer) in the total solid content of the slurry for the heat-durable layer may be the same as the ratio that are mentioned in the above regarding the heat-durable layer.

There is no particular limitation imposed on the device for mixing as long as the device can uniformly mix the aforementioned components. Examples thereof for use may include a ball mill, a sand mill, a pigment dispersing machine, a grinder, a ultrasonic dispersion machine, a homogenizer, and a planetary mixer. A high dispersion device such as a bead mill, a roll mill, and Filmix mixer is particularly preferably used since these devices are capable of providing high dispersion shear.

The viscosity of the slurry for the heat-durable layer may be a viscosity suitably for applying, and is preferably 10 to 300 mPa·s. By adjusting the viscosity of the slurry for the heat-durable layer within the aforementioned range, the heat-durable layer can be made thin, and a uniform heat-durable layer without uneven distribution of the binder and uneven distribution of the non-conductive particles can be produced. Further, uniform applicability, high-speed applicability and high preservation stability of the slurry for the heat-durable layer can also be achieved. In the present invention the viscosity of the slurry for the heat-durable layer is more preferably 10 to 200 mPa·s, and particularly preferably 20 to 100 mPa·s. The viscosity of the slurry for the heat-durable layer is a value measured by a E-type viscometer at 25° C. and a rotation speed of 60 rpm after 60 minutes ($\eta60$).

There is no limitation imposed on the method for forming a coating layer of the slurry for the heat-durable layer on the organic separator layer. The coating layer forming may be performed by, e.g., coating method and dipping method. Among these, coating method is preferable since thereby thickness of the heat-durable layer can be easily controlled. Examples of the coating method may include a doctor blade coating method, a dip coating method, a reverse roll coating method, a direct roll coating method, a gravure coating method, an extrusion coating method, and a brushing method. Among these, dip coating method and a gravure coating method are preferable since thereby a uniform heat-durable layer can be obtained.

There is no particular limitation imposed on the method for drying the coating layer of the slurry for the heat-durable layer formed on the organic separator layer, and examples thereof may include drying with air such as warm air, hot air and low humid air, vacuum drying, and drying methods by irradiation with, e.g., (far-)infrared ray and electron beam.

The drying temperature may be any temperature at which the dispersion medium is evaporated and removed from the coating layer. When the binder has a heat-crosslinkable group, it is preferable to perform the drying at a high temperature that is equal to or higher than the temperature at which the heat-crosslinkable group undergoes crosslinking reaction. By simultaneously performing removal of the dispersion medium from the coating layer and crosslinking, number of steps can be reduced and production efficiency can be improved. The drying is usually performed at 30 to 100° C.

In the production of the heat-durable layer, in addition to the aforementioned application step and drying step, another step may also be performed. For example, a pressing treatment may be performed with, e.g., a metal mold press or a roll press. By such a treatment, cohesiveness between the organic separator layer and the heat-durable layer can be improved. Pressure for the pressing treatment and pressing time may be appropriately controlled within ranges whereby the void ratio of the heat-durable layer is not impaired.

The thickness of the heat-durable layer is preferably 0.1 to 20 μm, more preferably 0.2 to 15 m, and particularly preferably 0.3 to 10 μm. By setting the thickness of the heat-durable layer within the aforementioned range, decrease in ion conductivity can be suppressed, and sufficient binding property can be obtained, whereby a heat-durable layer having a high cohesiveness with the organic separator layer can be formed.

(2.2. Method for Forming Adhesive Layer)

In the production method of the present invention, a slurry for the adhesive layer containing a particulate polymer having a glass transition temperature (Tg) of 10 to 100° C. is applied onto the heat-durable layer obtained in the aforementioned step, and then the slurry is dried, to form an adhesive layer.

The slurry for the adhesive layer may be produced by mixing a dispersion medium, the aforementioned particulate polymer, and the optional component. As the dispersion medium and the device for mixing, those that are similar to those used for the slurry for the heat-durable layer as mentioned in the above may be used.

In the present invention, by using the aforementioned components, a slurry for the adhesive layer in which the particulate polymer is highly dispersed can be obtained regardless of the mixing method and the order for mixing.

There is no particular limitation imposed on the method for applying the slurry for the adhesive layer, and examples thereof may be a doctor blade coating method, a dip coating method, a reverse roll coating method, a direct roll coating method, a spray coating method, a gravure coating method, an extrusion coating method, and a brushing method. Among these, a spray coating method is preferable from the viewpoint of productivity.

Examples of the method for drying the coating layer of the slurry for the adhesive layer may include drying with air such as warm air, hot air and low humid air, vacuum drying, and drying methods by irradiation with, e.g., (far-)infrared ray and electron beam. The drying temperature may be modified in accordance with the used medium. When a medium having a low volatility such as N-methylpyrrolidone is used, it is preferable to perform drying at a high temperature of 120° C. or higher using an air-blowing dryer for complete removal of the medium. Inversely when a medium having a high volatility is used, the drying may be performed at a low temperature of 100° C. or lower.

The thickness of the adhesive layer is preferably 0.1 to 5 μm, more preferably 0.3 to 4 μm, and particularly preferably 0.3 to 3 μm. When the thickness of the adhesive layer is within the aforementioned range, appropriate ion permeability and good adhesion property after electrode production between the electrode active material layer and the heat-durable layer can be simultaneously achieved.

(3. Secondary Battery)

The secondary battery of the present invention comprises a positive electrode, a negative electrode, an electrolyte solution, and the aforementioned secondary battery separator. Examples of the secondary battery may include a lithium-metal battery and a lithium ion secondary battery. The present invention is preferably applicable to the use in a lithium ion secondary battery since on the secondary battery there is the strongest demand for improvement in performance such as improvement in long cycle property and improvement in output property. In the following, explanation will be made regarding the case of applying the present invention to a lithium ion secondary battery.

(3.1 Electrode)

The positive electrode and the negative electrode are, in general, produced by forming an electrode active material layer on a current collector.

(3.1.1. Electrode Active Material Layer)

The electrode active material layer includes an electrode active material as an essential component. The electrode active material layer may exist solely. However, the electrode active material usually exists as a form of formulated material on a current collector.

The electrode active material layer may be formed by applying a mixture slurry containing the electrode active material and a dispersion medium onto a current collector, and then drying the slurry.

(3.1.1.1. Electrode Active Material)

The electrode active material for use in the electrode for the lithium ion secondary battery may be any material to and from which lithium ions can be reversibly intercalated and disintercalated by application of electric potential in an electrolyte solution. The material for use may be any of inorganic compounds and organic compounds.

The electrode active material for the positive electrode of the lithium ion secondary battery (positive electrode active material) are broadly classified into materials formed of inorganic compounds and materials formed of organic materials. Examples of the positive electrode active materials formed of inorganic compounds may include transition metal oxides, complex oxides of lithium and transition metals, and transition metal sulfides. Examples of the transition metals for use may include Fe, Co, Ni, and Mn. Specific examples of the inorganic compounds for the positive electrode active material may include: lithium-containing complex metal oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. These compounds may be partially element-substituted. Examples of the positive electrode active material formed of an organic compound for use may include electroconductive polymer compounds such as polyacetylene and poly-p-phenylene. An iron-based oxide having poor electric conductivity may be subjected to reduction firing in the presence of a carbon source substance so as to be used as an electrode active material covered with a carbon material. These compounds may be partially element-substituted.

The positive electrode active material for the lithium ion secondary battery may be a mixture of the aforementioned inorganic compound and organic compound. The particle diameter of the positive electrode active material is appropriately selected considering the balance with other components of the battery. In view of improvement in battery properties such as load property and cycle property, the volume average particle diameter D50 is preferably 0.1 to 50 μm, and more preferably 1 to 20 μm. When the volume average particle diameter D50 is within this range, a secondary battery with large charging/discharging capacity can be obtained, and easy handling in the process for producing the slurry for the electrode and the electrode can be achieved. The volume average particle diameter D50 of the positive electrode active material may be obtained by measuring particle size of the positive electrode active material using a laser diffraction particle size distribution measurement device.

Examples of the electrode active material for the negative electrode of the lithium ion secondary battery (negative electrode active material) may include carbonaceous materials such as amorphous carbon, graphite, natural graphite, mesocarbon microbeads, and pitch-based carbon fiber; and electroconductive polymers such as polyacene. Examples of the negative electrode active material may also include metals such as silicon, tin, zinc, manganese, iron, and nickel, and alloys thereof; oxides of these metals and alloys; and sulfates of these metals and alloys. In addition, metal lithium; lithium alloys such as Li—Al, Li—Bi—Cd, and Li—Sn—Cd; lithium transition metal nitrides; silicon, etc. may also be used. As the electrode active material, a material having a surface to which adhesion of a electroconductivity-imparting material is effected by mechanical modification may also be used. The particle diameter of the negative electrode active material is appropriately selected considering the balance with other components of the battery. In view of improvement in battery properties such as initial efficiency, load property and cycle property, the volume average particle diameter D50 of the negative electrode active material is preferably 1 to 50 μm, and more preferably 15 to 30 μm. The volume average particle diameter D50 of the negative electrode active material is measured in the same manner as for the positive electrode active material.

(3.1.1.2 Binder for Active Material Layer)

In the present invention, it is preferable that the electrode active material layer contains, in addition to the electrode active material, a binder for the active material layer. By containing the binder for the active material layer, binding property of the electrode active material layer in the electrode is improved, and strength against mechanical force applied in the step of, e.g., winding the electrode is increased. Further tendency to cause removal of the electrode active material layer of the electrode is reduced. Consequently, risk of, e.g., short-circuit caused by removed material is reduced.

As the binder for the active material layer, a variety of resin components may be used. For example, polyethylene, polytetrafluoroethylene (PTFE), polyvinylidene fluoride (PVDF), a tetrafluoroethylene-hexafluoropropylene copolymer (FEP), a polyacrylic acid derivative, a polyacrylonitrile derivative, etc., may be used. Any of these may be solely used, or two or more thereof may be used in combination.

Further, the soft polymers exemplified in the following may also be used as the binder for the active material layer.

An acrylic soft polymer, which is a homopolymer of derivative of acrylic acid or methacrylic acid or a copolymer of the derivative and a monomer copolymerizable therewith, such as polybutyl acrylate, polybutyl methacrylate, polyhydroxyethyl methacrylate, polyacrylamide, polyacrylonitrile, a butyl acrylate-styrene copolymer, a butyl acrylate-acrylonitrile copolymer, and a butyl acrylate-acrylonitrile-glycidyl methacrylate copolymer;

an isobutylene-based soft polymer such as polyisobutylene, isobutylene-isoprene rubber, and an isobutylene-styrene copolymer;

a diene-based soft polymer such as polybutadiene, polyisoprene, a butadiene-styrene random copolymer, an isoprene-styrene random copolymer, an acrylonitrile-butadiene copolymer, an acrylonitrile-butadiene-styrene copolymer, a butadiene-styrene block copolymer, a styrene-butadiene-styrene block copolymer, an isoprene-styrene block copolymer, and a styrene-isoprene-styrene block copolymer;

a silicon-containing soft polymer such as dimethyl polysiloxane, diphenyl polysiloxane, and dihydroxy polysiloxane;

an olefin-based soft polymer such as liquid polyethylene, polypropylene, poly-1-butene, an ethylene-α-olefin copolymer, a propylene-α-olefin copolymer, an ethylene-propylene-diene copolymer (EPDM), and an ethylene-propylene-styrene copolymer;

a vinyl-based soft polymer such as polyvinyl alcohol, polyvinyl acetate, polyvinyl stearate, and a vinyl acetate-styrene copolymer;

an epoxy-based soft polymer such as polyethylene oxide, polypropylene oxide, and epichlorohydrin rubber;

a fluorine-containing soft polymer such as vinylidene fluoride rubber and ethylene tetrafluoride-propylene rubber; and other soft polymers such as natural rubber, polypeptide, protein, a polyester-based thermoplastic elastomer, a vinyl chloride-based thermoplastic elastomer, and a polyamide-based thermoplastic elastomer. These soft polymers may have a crosslinked structure, or may have a functional group introduced by modification.

The amount of the binder for the active material layer in the electrode active material layer is preferably 0.1 to 5 parts by weight, more preferably 0.2 to 4 parts by weight, and still more preferably 0.5 to 3 parts by weight, with respect to 100 parts by weight of the electrode active material. When the amount of the binder for the active material layer in the electrode active material layer is within the aforementioned range, removal of the active material from the electrode can be prevented without inhibition of the battery reaction.

The binder for the active material layer is prepared as a solution or a dispersion liquid for producing the electrode. The viscosity at this time is preferably within a range of 1 to 300,000 mPa·s, and more preferably 50 to 10,000 mPa·s. The viscosity is a value measured by a B-type viscometer at 25° C. and a rotation speed of 60 rpm.

(3.1.1.3. Other Components)

In the secondary battery of the present invention, the electrode active material layer may include a electroconductivity-imparting material and a reinforcement material. As the electroconductivity-imparting material, electroconductive carbon such as acetylene black, Ketjen black, carbon black, graphite, vapor grown carbon fibers, and carbon nanotube may be used. Further examples thereof may include carbon powders of, e.g., graphite, and fiber and foil of a variety of metals. As the reinforcement material, a variety of inorganic or organic spherical, plate-shaped, rod-shaped, or fibrous fillers may be used. When the electroconductivity-imparting material is used, electric contact between the electrode active materials can be improved. In particular, when the material is used in the lithium ion secondary battery, the discharge rate property can thereby be improved. The using amounts of the electroconductivity-imparting material is preferably 0 to 20 parts by weight, and more preferably 1 to 10 parts by weight with respect of 100 parts by weight of the electrode active material.

(3.1.1.4. Dispersion Medium)

In a case wherein the electrode active material layer contains the binder for the active material layer, the dispersion medium for use in the production of the mixture slurry may be any of those in which these can be dissolved or dispersed in a form of particles.

Examples of the dispersion medium used for the mixture slurry may be the same as those of the dispersion media used for the aforementioned heat-durable layer.

Any of these dispersion media may be solely used, or any mixture of two or more thereof may be used. Any of these for use may be appropriately selected on the basis of the drying speed and from the viewpoint of environmental features.

The mixture slurry may further contain an additive for expressing a variety of functions, such as a thickener. As the thickener, a polymer that is soluble in the dispersion medium used for the mixture slurry is used. Specifically, e.g., a hydrogenated product of an acrylonitrile-butadiene copolymer is used.

In addition to the aforementioned components, trifluoropropylene carbonate, vinylene carbonate, catechol carbonate, 1,6-dioxaspiro[4,4]nonane-2,7-dione, 12-crown-4-ether, etc., may be used in the mixture slurry for enhancing the stability and lifetime of the battery. Further, these may be used by adding them to the electrolyte solution, which will be described later.

The amount of the dispersion medium in the mixture slurry is adjusted in accordance with the types of the electrode active material and the binder for the active material layer, so that the slurry has a viscosity suitable for coating. Specifically, the amount of the dispersion medium is adjusted so that the solid content concentration in the mixture slurry is adjusted to preferably 30 to 90 wt %, and more preferably 40 to 80 wt %, wherein the solid content is the total amount of the electrode active material, the binder for the active material layer, and the optional additives.

The mixture slurry is obtained by mixing using a mixing device the electrode active material, and the binder for the active material layer, the electroconductivity-imparting material, other optional additives and the dispersion medium that are added if necessary. The mixing may be performed by simultaneously supplying the aforementioned components into the mixing device. When the electrode active material, the binder for the active material layer, the electroconductivity-imparting material, and the thickener are used as constituents of the mixture slurry, it is preferable to mix the electroconductivity-imparting material and the thickener in the dispersion medium to disperse the electroconductivity-imparting material in a particulate form, and subsequently add thereto the binder for the active material layer and the electrode active material and further perform mixing, since thereby dispersibility of the mixture slurry is improved. As the device for mixing, the aforementioned devices may be used. It is preferable to use a ball mill since thereby aggregation of the electroconductivity-imparting material and the electrode active material can be suppressed.

The particle size of the mixture slurry is preferably 35 µm or less, and more preferably 25 µm or less. When the particle size of the mixture slurry is within the aforementioned range, the electroconductivity-imparting material can be highly dispersed, and therefore a uniform electrode can be obtained.

(3.1.2 Current Collector)

The current collector is not particularly limited as long as it is formed from a material having electroconductivity and electrochemical durability. From the viewpoint of having heat durability, preferable are metal materials such as iron, copper, aluminum, nickel, stainless steel, titanium, tantalum, gold, and platinum. Among these, aluminum is particularly preferable for the positive electrode of the non-aqueous electrolyte lithium ion secondary battery, and copper is particularly preferable for the negative electrode. There is no limitation imposed on the shape of the current collector. It is preferable that the shape is a sheet shape having a thickness of about 0.001 to 0.5 mm. It is preferable that the current collector is subjected to a surface roughing treatment in advance of its use, for enhancing the adhesion property with the electrode active material layer. Examples of the surface roughing method may include a mechanical polishing method, an electrolytic polishing method, and a chemical polishing method. In the mechanical polishing method, e.g., an abrasive cloth or paper to which abrasive particles are fixed, a grind stone, an emery wheel, a wire brush having steel wire, etc. is used. Further, in order to enhance the adhesion property with the electrode active material layer and electroconductivity, an intermediate layer may be formed on a surface of the current collector.

The method for producing the electrode active material layer may be a method wherein the electrode active material layer is attached to at least one surface, preferably both surface of the current collector in a form of a layer. For example, the mixture slurry is applied onto the current collector and dried, and then heated at 120° C. or more for one hour or more, to form an electrode active material layer. The method for applying the mixture slurry onto the current collector is not particularly limited. The same method as the method for applying the slurry for the heat-durable layer or the method for applying the slurry for the adhesive layer may be used.

It is preferable to subsequently perform a pressing treatment with, e.g., a metal mold press or a roll press to reduce the void ratio of the mixed material for the electrode. The void ratio is preferably in a range of 5 to 15%, and more preferably in a range of 7 to 13%. Excessively high void ratio may reduce charging efficiency and discharging efficiency. Excessively low void ratio may cause problems such as difficulty in obtaining high capacity per volume, and high tendency to cause removal of the mixed material which in turn cause high defect ratio. When a curable polymer is used, it is preferable to further perform curing.

Thickness of the electrode active material layer on both the positive electrode and the negative electrode is preferably 5 to 300 µm, and more preferably 10 to 250 µm.

(3.2. Electrolyte Solution)

As the electrolyte solution, an organic electrolyte solution in which a supporting electrolyte is dissolved in an organic solvent is used. As the supporting electrolyte, a lithium salt is used. The lithium salt is not particularly limited, and examples thereof may include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Among them, $LiPF_6$, $LiClO_4$, and $CF_3SO_3Li$ are preferable since they are easily dissolved in the organic solvent and show high degree of dissociation. Two of them may be co-used. Use of a supporting electrolyte having a higher dissociation degree results in higher lithium ion conductivity. Therefore, lithium ion conductivity can be controlled by selecting the type of the supporting electrolyte.

The organic solvent used for the electrolyte solution is not particularly limited as long as the supporting electrolyte can be dissolved therein. Examples of the preferable organic solvent for use may include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulphur-containing compounds such as sulfolane and dimethyl sulfoxide. Further, a mixture of these organic solvents may also be used. Among them, carbonates are preferable because of their high dielectric constant and wide range of stable electropotential. Use of the organic solvent having lower viscosity results in higher lithium ion conductivity. Therefore, the lithium ion conductivity can be controlled by selecting the type of the organic solvent.

The concentration of the supporting electrolyte in the electrolyte solution is preferably 1 to 30 wt %, and more preferably 5 to 20 wt %. The electrolyte is usually used at a concentration of 0.5 to 2.5 mol/L depending on the type of the supporting electrolyte. If the concentration of the supporting electrolyte is too low or high, the ion conductivity tends to decrease. Lower concentration of the used electrolyte solution results in higher swelling ratio of the polymer particles. Therefore, the lithium ion conductivity can be controlled by the concentration of the electrolyte solution.

(3.3. Production Method)

Specific examples of the method for producing the lithium ion secondary battery may include a method wherein the positive electrode and the negative electrode are stacked with the secondary battery separator of the present invention interposed therebetween to obtain a laminate, the laminate is then wound or folded in accordance with a battery shape and then put into a battery container, then the electrolyte solution is poured into the battery container, and then the battery container is sealed.

Upon producing the laminate, it is preferable to perform heat pressing on the laminate. The heat pressing is a method for simultaneously perform heating and pressing.

Pressing is performed with, e.g., a roll press machine with use of, e.g., a metal roll or a elastic roll, or a flat plate press machine. Examples of the style of pressing may include batch press and continuous roll press. The continuous roll press is preferable from the viewpoint of high productivity.

The temperature for the heat pressing is not particularly limited as long as structural breakage of the electrodes and the secondary battery separator constituting the laminate does not occur. The temperature is preferably 60 to 110° C., more preferably 70 to 105° C., and particularly preferably 80 to 100° C.

The pressure for the heat pressing is preferably 0.1 to 10 MPa, more preferably 0.3 to 5 MPa, and still more preferably 0.5 to 3 MPa. By setting the pressure for the heat pressing within the aforementioned range, firm adhesion between the electrode and the secondary battery separator can be achieved while maintaining the porosity of the secondary battery separator.

The time period for performing the heat pressing is preferably 2 to 60 seconds, more preferably 5 to 40 seconds, and still more preferably 8 to 20 seconds. By setting the time period for performing the heat pressing within the aforementioned range, firm adhesion between the electrode active material layer and the secondary battery separator can be achieved, and high productivity can be ensured.

If necessary, expanded metal; an over-current protection element such as fuse and a PTC element; a lead board; etc. may also be put in the battery container for preventing an increase in the pressure inside the battery and overcharging and overdischarging. The shape of the battery may be any of a coin shape, a button shape, a sheet shape, a cylinder shape, a rectangular shape, and a flat shape.

EXAMPLES

The present invention will be specifically explained hereinbelow referring to Examples. However, the present invention is not limited to the following Examples, and may be implemented with any modification in a scope without departing from the scope of claims of the present invention and equivalents thereto. Unless otherwise stated, "%" and "parts" that represent amounts in the following explanation are based on weight. Unless otherwise specified, the following operations were performed under the conditions of ordinary temperature and ordinary pressure.

(Evaluation Method)

[Peel Strength]

The secondary battery separator was cut out in a rectangular shape of width 10 mm×length 100 mm. To the adhesive layer surface thereof, a cellophane tape (defined in JIS Z1522) was attached, to obtain a test piece. Subsequently, the cellophane tape of the test piece was fixed on a test table. Keeping that state, an end of the secondary battery separator was pulled in a vertical direction at a pulling speed of 50 mm/minute to peel it off, and stress for the peeling was measured. The measurement was performed three times. The average thereof was calculated and this value was taken as peel strength. The peel strength was evaluated in accordance with the following criteria. Larger value of the peel strength is indicative of higher binding force of the complex layer of the heat-durable layer and the adhesive layer with the organic separator layer, i.e., higher adhesion strength.

A: Peel strength of 100 N/m or more
B: Peel strength of 75 N/m or more, and 100 N/m or less
C: Peel strength of 50 N/m or more, and 75 N/m or less
D: Peel strength of 50 N/m or less

[Gurley Value Increasing Ratio]

As to the secondary battery separator, Gurley Value (sec/100 cc) was measured using Gurley measurement device (manufactured by Kumagai Riki Kogyo CO., Ltd., SMOOTH & POROSITY METER (measurement diameter: ϕ2.9 cm)). By the measurement, increasing ratio of the Gurley value as a result of provision of the heat-durable layer and adhesive layer relative to the organic separator layer. The ratio was evaluated in accordance with the following criteria. Lower Gurley value increasing ratio is indicative of better ion permeability, and better rate property in a battery.

A: Gurley value increasing ratio is less than 10%
B: Gurley value increasing ratio is 10% or more, and less than 15%
C: Gurley value increasing ratio is 15% or more, and less than 20%
D: Gurley value increasing ratio is 20% or more

[Heat-Shrinking Property]

The secondary battery separator was cut out in a square shape of width 5 cm×length 5 cm, to obtain a test piece. The test piece was placed in a constant-temperature chamber at 150° C. and left stand for 1 hour, and change in the area of the square shape was measured as the heat-shrinking ratio. Smaller value of the heat-shrinking ratio is indicative of better heat-shrinking property of the secondary battery separator.

A: Heat-shrinking ratio is less than 1%
B: Heat-shrinking ratio is 1% or more, and less than 5%
C: Heat-shrinking ratio is 5% or more, and less than 10%
D: Heat-shrinking ratio is 10% or more

[Adhesion Property]

Each of the secondary battery separator and the negative electrode having the electrode active material layer is cut out in a square shape of width 3 cm×length 3 cm. They are stacked with the adhesion layer of the secondary battery separator being in contact with the electrode active material layer of the negative electrode. The stack was heat-pressed with heat pressing machine (manufactured by Tester Sangyo Co., Ltd., SA-501 high precision hot press machine) at 90° C. and conditions of 10 kg/cm² for 10 seconds, to obtain a laminate.

The negative electrode-side surface of the resulting laminate was fixed on a test table. Keeping that state, an end of the secondary battery separator was pulled in a vertical direction at a pulling speed of 50 mm/minute to peel it off, to evaluate adhesion property of the secondary battery separator and the electrode active material layer of the negative electrode. Peeling at the interface of (the electrode active material layer)/(the current collector) of the negative electrode is indicative of the highest adhesion property of the adhesive layer, and hence good cohesiveness between the secondary battery separator and the electrode active material layer of the negative electrode.

As to the laminate of the secondary battery separator and the positive electrode having the electrode active material layer, the same adhesion evaluation as the aforementioned evaluation was performed. When the evaluation of the adhesion between the secondary battery separator and the electrode active material layer of the positive electrode was the same as the evaluation result regarding the negative electrode, only the test result of the negative electrode is described.

All of the laminates obtained in Examples and Comparative Examples did not cause peeling at the interface of the heat-durable layer and the organic separator layer.

A: Peeling at the interface of (the electrode active material layer)/(the current collector) of the negative electrode
B: Peeling at the interface of (the heat-durable layer)/(the adhesive layer), or peeling at the interface of (the adhesive layer)/(the electrode active material layer of the negative electrode)
C: The adhesive layer of the secondary battery separator did not adhere to the electrode active material layer of the negative electrode.

[Adhesion Property of the Adhesive Layer in Electrolyte Solution]

The laminate of the secondary battery separator and the negative electrode having the electrode active material layer was cut in a shape having a width of 10 mm, and immersed in the electrolyte solution that was the same as the one used for the battery production at a temperature of 60° C. for 3 days. This was then taken out, and, while this was still in a wet state, the secondary battery separator was peeled off. Adhesion at this time was evaluated in accordance with the following criteria.

Higher resistance upon peeling of the secondary battery separator off the electrode active material layer of the negative electrode is indicative of high adhesion keeping property of the adhesive layer in the electrolyte solution.

As to the laminate of the secondary battery separator and the positive electrode having the electrode active material layer, the same adhesion evaluation as the aforementioned evaluation was performed. When the evaluation of the adhesion between the secondary battery separator and the electrode active material layer of the positive electrode was the same as the evaluation result regarding the negative electrode, only the test result of the negative electrode is described.

A: Resistance is present upon peeling (good adhesion property)
B: Almost no resistance is present upon peeling (poor adhesion property)
C: Already peeled off when taken out of the electrolyte solution

[Anti-Blocking Property Test]

The secondary battery separator was cut out to prepare test pieces in square shapes of width 5 cm×length 5 cm and width 4 cm×length 4 cm.

A stack of these two pieces (unpressed state) and another stack that was subjected to pressing of 10 kg/cm² at 40° C. after stacking were left stand for 24 hours. After leaving for 24 hours, adhesion state (blocking state) of the stack of the secondary battery separators was visually observed, and evaluated in accordance with the following criteria.

A: No blocking between the secondary battery separators occurred
B: Blocking between the secondary battery separators occurred but peelable
C: Blocking between the secondary battery separators occurred and unpeelable
D: Blocking between the secondary battery separators occurred even with the uupressed state

[High-Temperature Cycle Property]

10 full-cell coin-type battery cells were subjected to 50 times (=50 cycles) of charging/discharging at 60° C. atmosphere at a 0.2 C constant current method wherein cells were charged to 4.2V and discharged to 3V, and electric capacity was measured. The average of the 10 cells was taken as a measured value. The ratio of the electric capacity at the end of 50th cycle with respect to the electric capacity at the end of 5th cycle was calculated as percentage to obtain charging/discharging capacity retention ratio. This was used as an index for evaluating cycle property. Higher value of this ratio is indicative of better high-temperature cycle property.

A: Charging/discharging capacity retention ratio is 80% or more.
B: Charging/discharging capacity retention ratio is 70% or more, and less than 80%.
C: Charging/discharging capacity retention ratio is 60% or more, and less than 70%.
D: Charging/discharging capacity retention ratio is less than 60%.

[Rate Property (Load Property)]

With 10 full-cell coin-type battery cells, a charging/discharging cycle at 25° C. wherein cells were charged to 4.2V at a 0.1 C constant current and then discharged to 3V at a 0.1 C constant current, and another charging/discharging cycle at 25° C. wherein cells were charged to 4.2V at a 1 C constant current and then discharged to 3V at a 1 C constant current were each performed. The ratio of the discharge capacity at 1 C with respect to the battery capacity at 0.1 C was calculated as percentage to obtain a charging/discharging rate property.

The battery capacity at 0.1 C is the discharging capacity when discharging was performed to 3V at the 0.1 C constant current, whereas the discharge capacity at 1 C is the discharging capacity when discharging was performed to 3V at the 1 C constant current.

The charging/discharging rate property was evaluated in accordance with the following criteria. Larger value is indicative of smaller internal resistance and capability of high-speed charging/discharging.

A: Charging/discharging rate property is 80% or more.

B: Charging/discharging rate property is 75% or more, and less than 80%.

C: Charging/discharging rate property is 70% or more, and less than 75%.

D: Charging/discharging rate property is less than 70%.

[Battery Expansion Property]

After performing the aforementioned measurement of rate property as to the obtained full-cell coin-type battery cells, the batteries were disassembled, and generation of bubbles in the electrolyte solution and existence of uplifting of the secondary battery separator from the electrode were observed.

Absence of recognition of bubble generation and uplifting of the secondary battery separator is indicative of firm fixing of the positive electrode and the negative electrode with the secondary battery separator, and hence suppression of unevenness of the voltage distribution in the secondary battery and suppression of battery expansion, explosion and liquid leaking due to gas generation by, e.g., decomposition of the electrolyte solution.

A: Cases with no recognition of the bubble generation or the uplifting of the secondary battery separator B: Cases with recognition of either one of the bubble generation and the uplifting of the secondary battery separator C: Cases with recognition of both the bubble generation and the uplifting of the secondary battery separator

[Method for Measuring Swelling Ratio of Particulate Polymer in Reference Solution]

The particulate polymer was molded in a form of a film, to obtain a test piece film. The test piece film was cut out in 1 cm square pieces, and weights thereof were measured. Into a reference solution that is a solution of $LiPF_6$ at a concentration of 1 mol/L dissolved in a mixed solvent of ethylene carbonate (EC) and diethyl carbonate (DEC) which are mixed at a volume ratio of EC:DEC=1:2, the test pieces were immersed at 60° C. for 72 hours, and then taken out of the reference solution. The test pieces were gently pressed with filter paper to wipe the reference solution off, and the weight after immersion test was measured. (Weight after immersion test/weight before immersion test) was obtained as the swelling ratio (unit: times).

Example 1

(Production of Binder for Heat-Durable Layer)

In a reactor equipped with a stirrer, 70 parts of ion-exchanged water, 0.15 parts of sodium laurylsulfate (manufactured by Kao Chemicals, product name: "Aimard 2F") as an emulsifier, and 0.5 parts of ammonium persulfate were supplied. The gas-phase part was substituted by nitrogen gas, and temperature was elevated to 60° C.

Separately, in another container, 50 parts of ion-exchanged water, 0.5 parts of sodium dodecylbenzenesulfonate as a dispersing agent, and, as polymerizable monomers, 94.8 parts of butyl acrylate, 2 parts of acrylonitrile, 1 part of methacrylic acid, 1.2 parts of N-methylolacrylamide and 1 part of allyl glycidyl ether (AGE) were mixed to obtain a monomer mixture. The monomer mixture was continuously added to the aforementioned reactor over 4 hours, to perform polymerization. During the addition, reaction was performed at 60° C. After finishing the addition, the mixture was further stirred at 70° C. for 3 hours, before finishing the reaction. In this manner, an aqueous dispersion liquid containing (meth)acrylic polymer as the binder for a heat-durable layer was produced.

In the obtained (meth)acrylic polymer (abbreviated in Tables 1 to 3 as "ACL"), the content ratio of the crosslinkable monomer unit was 2.2%. The volume average particle diameter D50 of the (meth)acrylic polymer was 0.36 μm, and the glass transition temperature thereof was −45° C.

(Production of Slurry for Heat-Durable Layer)

As the non-conductive particles, alumina particles (AKP-3000 manufactured by Sumitomo Chemical Co., Ltd., volume average particle diameter D50=0.45 μm, tetrapod-shaped particles) were prepared.

As the viscosity modifier, carboxymethyl cellulose having etherification degree of 0.8 to 1.0 (manufactured by Daicel FineChem Ltd., product name "D1200") was used. The viscosity of 1% aqueous solution of the viscosity modifier was 10 to 20 mPa·s.

100 parts of the non-conductive particles, 1.5 pars of the viscosity modifier, and ion-exchanged water was mixed to produce a dispersion so that the solid content concentration was adjusted to 40 wt %. Further, 4 parts as the solid content of the aforementioned aqueous dispersion liquid containing the (meth)acrylic polymer as the binder, and 0.2 parts of polyethylene glycol type surfactant (San Nopco Limited, "SN Wet 366") were further admixed, to produce a slurry for a heat-durable layer.

(Production of Particulate Polymer A)

In a 5 MPa pressure resistant container equipped with a stirrer, 35 parts of ethyl acrylate and 34.2 parts of butyl acrylate as (meth)acrylic acid ester monomers, 30 parts of methacrylic acid as an ethylenically unsaturated carboxylic acid monomer, 0.8 parts of ethylene dimethacrylate as a crosslinkable monomer, 1 part of sodium dodecylbenzenesulfonate as an emulsifier, 150 parts of ion-exchanged water, and 0.5 parts of potassium persulfate as a polymerization initiator were placed and sufficiently stirred. Then the mixture was heated to 60° C. to initiate polymerization. When the polymerization conversion ratio reached 96%, the mixture was cooled to terminate the reaction, to produce an aqueous dispersion liquid containing particulate polymer A.

In the obtained particulate polymer A, the content ratio of the (meth)acrylic acid ester monomer unit was 69.2%, the content ratio of the ethylenically unsaturated carboxylic acid monomer unit was 30%, and the content ratio of the crosslinkable monomer unit was 0.8%.

The volume average particle diameter D50 of the obtained particulate polymer A was 0.15 μm, and the glass transition temperature thereof was 59° C.

(Production of Slurry for Adhesion Layer)

100 parts of the obtained particulate polymer A, 4 parts as solid content of the aforementioned (meth)acrylic polymer (obtained as the binder for the heat-durable layer) as a binder, and ion-exchanged water were mixed so that the solid content concentration was adjusted to 20%. The mixture was used as a slurry for an adhesive layer.

(Production of Secondary Battery Separator)

A porous substrate made of polyethylene (thickness 16 μm, Gurley value 210 s/100 cc) was prepared. This was used as an organic separator layer. Onto both surfaces thereof, the aforementioned slurry for a heat-durable layer was applied. The slurry was dried at 50° C. for 3 minutes. In this manner, a multi-layer product (X) having on both surfaces heat-durable layers each having a thickness of 3 μm was obtained.

Subsequently, onto each heat-durable layer of the multi-layer product (X), the aforementioned slurry for an adhesive layer was applied by spray coating method. The slurry was dried at 50° C. for 1 minute, to obtain a secondary battery separator having on both surfaces adhesive layers each having a thickness of 0.5 μm. The swelling ratio of the particulate polymer A constituting the adhesive layer in the aforementioned reference solution was 3.5 times.

As to the obtained secondary battery separator, peel strength, Gurley value increasing ratio, heat-shrinking property, and anti-blocking property were evaluated. The results are shown in Table 1.

(Production of Positive Electrode)

To 95 parts of lithium manganate having a spinel structure as a positive electrode active material, 3 parts as the solid content of PVDF (polyvinylidene fluoride, manufactured by Kureha Corporation, trade name: "KF-1100") as a binder was added. Further, 2 parts of acetylene black, and 20 parts of N-methylpyrrolidone was added thereto. These were mixed with a planetary mixer to obtain a mixture slurry for a positive electrode. The mixture slurry for a positive electrode was applied onto one surface of an aluminum foil having a thickness of 18 μm. The slurry was dried at 120° C. for 3 hours, and then roll-pressed, to thereby obtain a positive electrode having an electrode active material layer and having a total thickness of 100 μm.

(Production of Negative Electrode)

98 parts of graphite having a particle diameter of 20 μm and BET specific surface area of 4.2 m$^2$/g as a negative electrode active material, and 1 part as solid content of SBR (styrene-butadiene rubber, glass transition temperature (Tg): −10° C.) as a binder were mixed. To this mixture, 1 part of carboxymethyl cellulose was further admixed. Further, water as a solvent was added. These were mixed with a planetary mixer, to obtain a mixture slurry for a negative electrode. This mixture slurry for a negative electrode was applied onto one surface of a copper foil having a thickness of 18 μm. The slurry was dried at 120° C. for three hours, and then roll-pressed, to thereby obtain a negative electrode having an electrode active material layer and having a total thickness of 60 μm.

(Production of (Negative Electrode)/(Secondary Battery Separator)/(Positive Electrode) Laminate)

The aforementioned positive electrode was cut out into a disc shape having a diameter of 13 mm, to obtain a positive electrode disc. The aforementioned negative electrode was cut out into a disc shape having a diameter of 14 mm, to obtain a negative electrode disc. Further, the aforementioned secondary battery separator was cut out into a disc shape having a diameter of 18 mm, to obtain a secondary battery separator disc.

The positive electrode disc was aligned with the front surface of the secondary battery separator disc. Concurrently, the negative electrode disc was aligned with the back surface, to stack them.

The stack of the negative electrode disc, the secondary battery separator disc and the positive electrode disc was heat-pressed at a temperature of 80° C. and a pressure of 0.5 MPa for 10 seconds, to press-bond the positive electrode disc and the negative electrode disc to the secondary battery separator disc.

In this manner, a laminate disc having a layer structure of (the negative electrode)/(the secondary battery separator)/(the positive electrode) was produced wherein the positive electrode and the negative electrode were bonded to the adhesive layers of the secondary battery separator.

Separately, on one surface of the secondary battery separator disc, only one of the negative electrode disc or the positive electrode disc was aligned, and then heat-pressing was performed in the same manner as in the production method for the laminate disc, to produce a sample for evaluating adhesion of the adhesive layer. As to the obtained sample for evaluating adhesion, adhesion property of the adhesive layer, and adhesion property of the adhesive layer in the electrolyte solution were evaluated. The results are shown in Table 1.

On the inner-bottom surface of a stainless steel coin-type outer container provided with polypropylene gasket, the laminate disc was placed to accommodate this in the container.

An electrolyte solution was poured in the container so that air did not remain therein. Then the outer container was covered with a cap of stainless steel having a thickness of 0.2 mm via the polypropylene gasket and fastened to seal the battery can. Thus a full-cell type lithium ion secondary battery (coin cell CR2032) having a diameter of 20 mm and thickness of 3.2 mm was produced. As the electrolyte solution, a solution of LiPF$_6$ at a concentration of 1 mol/L dissolved in a mixed solvent of ethylene carbonate (EC) and diethyl carbonate (DEC) which are mixed at EC:DEC=1:2 (volume ratio at 20° C.) was used. As to the obtained battery, battery expansion property, high-temperature cycle property and rate property were measured. The results are shown in Table 1.

Example 2

In the production of the slurry for the heat-durable layer, boehmite particles (manufactured by Nabaltec, APYRAL AOH 60, volume average particle diameter D50=0.9 μm, plate-shaped particles) were used as the non-conductive particles. Except for that, production of the slurry for the heat-durable layer, the slurry for the adhesive layer, the secondary battery separator and the secondary battery, and evaluation for each of them were performed in the same manner as in Example 1. The results are shown in Table 1.

Example 3

In the production of the slurry for the heat-durable layer, magnesium hydroxide (manufactured by Konoshima Chemical Co., Ltd., volume average particle diameter D50=1.2 μm, a mixture of ellipsoid particles and polyhedron-shaped particles having rounded apexes) were used as the non-conductive particles. Except for that, production of the slurry for the heat-durable layer, the slurry for the adhesive layer, the secondary battery separator and the secondary battery, and evaluation for each of them were performed in the same manner as in Example 1. The results are shown in Table 1.

Example 4

(Production of Polymer Particles)

In a reactor equipped with a stirrer, 95 parts of styrene, 5 parts of acrylic acid, 1 part of sodium dodecylbenzenesulfonate, 100 parts of ion-exchanged water, and 0.5 parts of potassium persulfate were placed, and polymerized at 80° C. for 8 hours.

In this manner, an aqueous dispersion of seed polymer particles A having a number average particle diameter of 58 nm were obtained.

In a reactor equipped with a stirrer, 2 parts on the basis of solid content (i.e., on the basis of the weight of the seed polymer particles A) of the aqueous dispersion of the seed polymer particles A, 0.2 parts of sodium dodecylbenzenesulfonate, 0.5 parts of potassium persulfate, and 100 parts of ion-exchanged water were placed and mixed to prepare a mixture A, which was then heated to 80° C. Separately, in another container, 82 parts of styrene, 15.3 parts of methyl methacrylate, 2 parts of itaconic acid, 0.7 parts of acrylamide, 0.5 parts of sodium dodecylbenzenesulfonate, and 100 parts of ion-exchanged water were mixed, to prepare a dispersion of a monomer mixture C. This dispersion of the monomer mixture C was continuously added to the mixture A obtained in the aforementioned procedure over 4 hours, to perform polymerization. During the continuous addition of the dispersion of the monomer mixture C, the temperature of the reaction system was maintained at 80° C. for performing the reaction. After finishing the continuous addition, reaction was further continued at 90° C. for 3 hours. In this manner, an aqueous dispersion of seed polymer particles B having a number average particle diameter of 198 nm were obtained.

Subsequently, in a reactor equipped with a stirrer, 20 parts on the basis of solid content (i.e., on the basis of the weight of the seed polymer particles B) of the aqueous dispersion of the seed polymer particles B, 100 parts of monomer mixture 2 (a mixture of divinylbenzene and ethylvinylbenzene, monomer mixing ratio: divinylbenzene/ethylvinylbenzene=60/40, manufactured by Nippon Steel Chemical Co., Ltd., product name: "DVB-570"), 0.5 parts of sodium dodecylbenzenesulfonate, 4 parts of t-butylperoxy-2-ethylhexanoate (manufactured by by NOF CORPORATION, trade name: "Perbutyl O") as a polymerization initiator, 540 parts of ion-exchanged water, and 60 parts of ethanol were placed, and stirred at 35° C. for 12 hours, so that the seed polymer particles B completely absorbed the monomer mixture 2 and the polymerization initiator. Then, this was polymerized at 90° C. for 7 hours. Then, steam was introduced thereinto for removing the unreacted monomers and ethanol, to obtain an aqueous dispersion liquid of polymer particles. These polymer particles were in a spherical shape, and the volume average particle diameter D50 was 0.45 μm.

In the production of the slurry for the heat-durable layer, the aforementioned polymer particles were used as the non-conductive particles. Except for that, production of the slurry for the heat-durable layer, the slurry for the adhesive layer, the secondary battery separator and the secondary battery, and evaluation for each of them were performed in the same manner as in Example 1. The results are shown in Table 1.

Example 5

(Production of Particulate Polymer B)

In a 5 MPa pressure resistant container equipped with a stirrer, 62.2 parts of ethyl acrylate as a (meth)acrylic acid ester monomer, 2 parts of methacrylic acid as an ethylenically unsaturated carboxylic acid monomer, 35 parts of styrene as an aromatic vinyl monomer, 0.8 parts of ethylene dimethacrylate as a crosslinkable monomer, 1 part of sodium dodecylbenzenesulfonate as an emulsifier, 150 parts of ion-exchanged water, and 0.5 parts of potassium persulfate as a polymerization initiator were placed and sufficiently stirred. Then the mixture was heated to 60° C. to initiate polymerization. When the polymerization conversion ratio reached 96%, the mixture was cooled to terminate the reaction, to obtain an aqueous dispersion liquid containing a particulate polymer B.

In the obtained particulate polymer B, the content ratio of the (meth)acrylic acid ester monomer unit was 62.2%, the content ratio of the aromatic vinyl monomer unit was 35%, the content ratio of the ethylenically unsaturated carboxylic acid monomer unit was 2%, and the content ratio of the crosslinkable monomer unit was 0.8%. The volume average particle diameter D50 of the obtained particulate polymer B was 0.15 μm, and the glass transition temperature thereof was 27° C. The swelling ratio of the particulate polymer B constituting this adhesive layer in the reference solution was 4 times.

In the production of the slurry for the adhesive layer, the particulate polymer B was used as the particulate polymer. Except for that, production of the slurry for the heat-durable layer, the slurry for the adhesive layer, the secondary battery separator and the secondary battery, and evaluation for each of them were performed in the same manner as in Example 1. The results are shown in Table 1.

Example 6

(Production of Particulate Polymer C)

In a 5 MPa pressure resistant container equipped with a stirrer, 52.2 parts of ethyl acrylate as a (meth)acrylic acid ester monomer, 2 parts of methacrylic acid as an ethylenically unsaturated carboxylic acid monomer, 45 parts of styrene as an aromatic vinyl monomer, 0.8 parts of ethylene dimethacrylate as a crosslinkable monomer, 1 part of sodium dodecylbenzenesulfonate as an emulsifier, 150 parts of ion-exchanged water, and 0.5 parts of potassium persulfate as a polymerization initiator were placed and sufficiently stirred. Then the mixture was heated to 60° C. to initiate polymerization. When the polymerization conversion ratio reached 96%, the mixture was cooled to terminate the reaction, to obtain an aqueous dispersion liquid containing a particulate polymer C.

In the obtained particulate polymer C, the content ratio of the (meth)acrylic acid ester monomer unit was 52.2%, the content ratio of the aromatic vinyl monomer unit was 45%, the content ratio of the ethylenically unsaturated carboxylic acid monomer unit was 2%, and the content ratio of the crosslinkable monomer unit was 0.8%. The volume average particle diameter D50 of the obtained particulate polymer C was 0.15 μm, and the glass transition temperature thereof was 39° C. The swelling ratio of the particulate polymer C constituting this adhesive layer in the reference solution was 3.5 times.

In the production of the slurry for the adhesive layer, the particulate polymer C was used as the particulate polymer for producing the slurry for the adhesive layer. Except for that, production of the slurry for the heat-durable layer, the slurry for the adhesive layer, the secondary battery separator and the secondary battery, and evaluation for each of them were performed in the same manner as in Example 1. The results are shown in Table 1.

Example 7

(Production of Particulate Polymer D)

In a 5 MPa pressure resistant container equipped with a stirrer, 22.2 parts of ethyl acrylate as a (meth)acrylic acid ester monomer, 2 parts of methacrylic acid as an ethylenically unsaturated carboxylic acid monomer, 75 parts of styrene as an aromatic vinyl monomer, 0.8 parts of ethylene dimethacrylate as a crosslinkable monomer, 1 part of sodium dodecylbenzenesulfonate as an emulsifier, 150 parts of ion-exchanged water, and 0.5 parts of potassium persulfate as a polymerization initiator were placed and sufficiently stirred. Then the mixture was heated to 60° C. to initiate polymerization. When the polymerization conversion ratio reached 96%, the mixture was cooled to terminate the reaction, to obtain an aqueous dispersion liquid containing a particulate polymer D.

In the obtained particulate polymer D, the content ratio of the (meth)acrylic acid ester monomer unit was 22.2%, the content ratio of the aromatic vinyl monomer unit was 75%, the content ratio of the ethylenically unsaturated carboxylic acid monomer unit was 2%, and the content ratio of the crosslinkable monomer unit was 0.8%. The volume average particle diameter D50 of the obtained particulate polymer D was 0.15 μm, and the glass transition temperature thereof was 76° C. The swelling ratio of the particulate polymer D constituting this adhesive layer in the reference solution was 3 times.

In the production of the slurry for the adhesive layer, the particulate polymer D was used as the particulate polymer for producing the slurry for the adhesive layer. Except for that, production of the slurry for the heat-durable layer, the slurry for the adhesive layer, the secondary battery separator and the secondary battery, and evaluation for each of them were performed in the same manner as in Example 1. The results are shown in Table 2.

Example 8

(Production of Particulate Polymer E)

In a 5 MPa pressure resistant container equipped with a stirrer, 12.2 parts of ethyl acrylate as a (meth)acrylic acid ester monomer, 2 parts of methacrylic acid as an ethylenically unsaturated carboxylic acid monomer, 85 parts of styrene as an aromatic vinyl monomer, 0.8 parts of ethylene dimethacrylate as a crosslinkable monomer, 1 part of sodium dodecylbenzenesulfonate as an emulsifier, 150 parts of ion-exchanged water, and 0.5 parts of potassium persulfate as a polymerization initiator were placed and sufficiently stirred. Then the mixture was heated to 60° C. to initiate polymerization. When the polymerization conversion ratio reached 96%, the mixture was cooled to terminate the reaction, to obtain an aqueous dispersion liquid containing a particulate polymer E.

In the obtained particulate polymer E, the content ratio of the (meth)acrylic acid ester monomer unit was 12.2%, the content ratio of the aromatic vinyl monomer unit was 85%, the content ratio of the ethylenically unsaturated carboxylic acid monomer unit was 2%, and the content ratio of the crosslinkable monomer unit was 0.8%. The volume average particle diameter D50 of the obtained particulate polymer E was 0.15 μm, and the glass transition temperature thereof was 84° C. The swelling ratio of the particulate polymer E constituting this adhesive layer in the reference solution was 3 times.

In the production of the slurry for the adhesive layer, the particulate polymer E was used as the particulate polymer. Except for that, production of the slurry for the heat-durable layer, the slurry for the adhesive layer, the secondary battery separator and the secondary battery, and evaluation for each of them were performed in the same manner as in Example 1. The results are shown in Table 2.

Example 9

In the production of the secondary battery separator, the thickness of the adhesive layer was changed to 0.2 μm. Except for that, production of the slurry for the heat-durable layer, the slurry for the adhesive layer, the secondary battery separator and the secondary battery, and evaluation for each of them were performed in the same manner as in Example 1. The results are shown in Table 2.

Example 10

In the production of the secondary battery separator, the thickness of the adhesive layer was changed to 1.5 μm. Except for that, production of the slurry for the heat-durable layer, the slurry for the adhesive layer, the secondary battery separator and the secondary battery, and evaluation for each of them were performed in the same manner as in Example 1. The results are shown in Table 2.

Example 11

In the production of the secondary battery separator, the thickness of the adhesive layer was changed to 3 μm. Except for that, production of the slurry for the heat-durable layer, the slurry for the adhesive layer, the secondary battery separator and the secondary battery, and evaluation for each of them were performed in the same manner as in Example 1. The results are shown in Table 2.

Example 12

In the production of the secondary battery separator, the slurry for the adhesive layer was applied by gravure coating method. Except for that, production of the slurry for the heat-durable layer, the slurry for the adhesive layer, the secondary battery separator and the secondary battery, and evaluation for each of them were performed in the same manner as in Example 1. The results are shown in Table 2.

Comparative Example 1

In the production of the secondary battery separator, the adhesive layer was not formed. Except for that, production of the slurry for the heat-durable layer, the secondary battery separator and the secondary battery, and evaluation for each of them were performed in the same manner as in Example 1. The results are shown in Table 3.

Comparative Example 2

(Production of Particulate Polymer F)

In a 5 MPa pressure resistant container equipped with a stirrer, 74.2 parts of ethyl acrylate as a (meth)acrylic acid ester monomer, 10 parts of methacrylic acid as an ethylenically unsaturated carboxylic acid monomer, 15 parts of styrene as an aromatic vinyl monomer, 0.8 parts of ethylene dimethacrylate as a crosslinkable monomer, 1 part of sodium dodecylbenzenesulfonate as an emulsifier, 150 parts of ion-exchanged water, and 0.5 parts of potassium persulfate as a polymerization initiator were placed and sufficiently stirred.

Then the mixture was heated to 60° C. to initiate polymerization. When the polymerization conversion ratio reached 96%, the mixture was cooled to terminate the reaction, to obtain an aqueous dispersion liquid containing a particulate polymer F.

In the obtained particulate polymer F, the content ratio of the (meth)acrylic acid ester monomer unit was 74.2%, the content ratio of the aromatic vinyl monomer unit was 15%, the content ratio of the ethylenically unsaturated carboxylic acid monomer unit was 10%, and the content ratio of the crosslinkable monomer unit was 0.8%. The volume average particle diameter D50 of the obtained particulate polymer F was 0.15 μm, and the glass transition temperature thereof was 5° C. The swelling ratio of the particulate polymer F constituting this adhesive layer in the reference solution was 3 times.

In the production of the slurry for the adhesive layer, the particulate polymer F was used as the particulate polymer. Except for that, production of the slurry for the heat-durable layer, the slurry for the adhesive layer and the secondary battery separator, and evaluation for each of them were performed in the same manner as in Example 1. As the anti-blocking property of the secondary battery separator was poor, production and evaluation of the secondary battery were not performed. The results are shown in Table 3.

Comparative Example 3

(Production of Particulate Polymer G)

In a 5 MPa pressure resistant container equipped with a stirrer, 29.2 parts of ethyl acrylate as a (meth)acrylic acid ester monomer, 30 parts of methacrylic acid as an ethylenically unsaturated carboxylic acid monomer, 40 parts of styrene as an aromatic vinyl monomer, 0.8 parts of ethylene dimethacrylate as a crosslinkable monomer, 1 part of sodium dodecylbenzenesulfonate as an emulsifier, 150 parts of ion-exchanged water, and 0.5 parts of potassium persulfate as a polymerization initiator were placed and sufficiently stirred. Then the mixture was heated to 60° C. to initiate polymerization. When the polymerization conversion ratio reached 96%, the mixture was cooled to terminate the reaction, to obtain an aqueous dispersion liquid containing a particulate polymer G.

In the obtained particulate polymer G, the content ratio of the (meth)acrylic acid ester monomer unit was 29.2%, the content ratio of the aromatic vinyl monomer unit was 40%, the content ratio of the ethylenically unsaturated carboxylic acid monomer unit was 30%, and the content ratio of the crosslinkable monomer unit was 0.8%. The volume average particle diameter D50 of the obtained particulate polymer G was 0.15 μm, and the glass transition temperature thereof was 112° C. The swelling ratio of the particulate polymer G constituting this adhesive layer in the reference solution was 2 times.

In the production of the slurry for the adhesive layer, the particulate polymer G was used as the particulate polymer. Except for that, production of the slurry for the heat-durable layer, the slurry for the adhesive layer, the secondary battery separator and the secondary battery, and evaluation for each of them were performed in the same manner as in Example 1. The results are shown in Table 3.

Comparative Example 4

(Production of Particulate Polymer H)

In a 5 MPa pressure resistant container equipped with a stirrer, 87.8 parts of ethyl acrylate as a (meth)acrylic acid ester monomer, 2 parts of methacrylic acid as an ethylenically unsaturated carboxylic acid monomer, 10 parts of acrylonitrile as a (meth)acrylonitrile monomer unit, 0.2 parts of ethylene dimethacrylate as a crosslinkable monomer, 1 part of sodium dodecylbenzenesulfonate as an emulsifier, 150 parts of ion-exchanged water, and 0.5 parts of potassium persulfate as a polymerization initiator were placed and sufficiently stirred. Then the mixture was heated to 60° C. to initiate polymerization. When the polymerization conversion ratio reached 96%, the mixture was cooled to terminate the reaction, to obtain an aqueous dispersion liquid containing a particulate polymer H.

In the obtained particulate polymer H, the content ratio of the (meth)acrylic acid ester monomer unit was 87.8%, the content ratio of the (meth)acrylonitrile monomer unit was 10%, the content ratio of the ethylenically unsaturated carboxylic acid monomer unit was 2%, and the content ratio of the crosslinkable monomer unit was 0.2%. The volume average particle diameter D50 of the obtained particulate polymer H was 0.15 μm, and the glass transition temperature thereof was 5° C. The swelling ratio of the particulate polymer H constituting this adhesive layer in the reference solution was 17 times.

In the production of the slurry for the adhesive layer, the particulate polymer H was used as the particulate polymer. Except for that, production of the slurry for the heat-durable layer, the slurry for the adhesive layer and the secondary battery separator, and evaluation for each of them were performed in the same manner as in Example 1. As the anti-blocking property of the secondary battery separator was poor, production and evaluation of the secondary battery were not performed. The results are shown in Table 3.

Comparative Example 5

In the production of the slurry for the adhesive layer, the particulate polymer H was used as the particulate polymer, and the obtained slurry for the adhesive layer was applied by gravure coating method to form an adhesive layer having a thickness of 10 μm. Except for that, production of the slurry for the heat-durable layer, the slurry for the adhesive layer and the secondary battery separator, and evaluation for each of them were performed in the same manner as in Example 1. As the anti-blocking property of the secondary battery separator was poor, production and evaluation of the secondary battery were not performed. The results are shown in Table 3.

TABLE 1

|  |  | Ex. 1 | Ex. 2 | Ex. 3 | Ex. 4 | Ex. 5 | Ex. 6 |
|---|---|---|---|---|---|---|---|
| Heat durable layer | Non-conductive particle material | Alumina | Boehmite | Magnesium oxide | Polymer | Alumina | Alumina |
|  | Non-conductive particle form | Tetrapod | Plate | Mixture *1 | Sphere | Tetrapod | Tetrapod |
|  | Binder for heat-durable layer | ACL | ACL | ACL | ACL | ACL | ACL |
|  | Thickness (μm) | 3 | 3 | 3 | 3 | 3 | 3 |

TABLE 1-continued

|  |  |  | Ex. 1 | Ex. 2 | Ex. 3 | Ex. 4 | Ex. 5 | Ex. 6 |
|---|---|---|---|---|---|---|---|---|
| Adhesive layer | Particulate polymer | Acrylic acid ester monomer content ratio (wt %) | 69.2 | 69.2 | 69.2 | 69.2 | 62.2 | 52.2 |
|  |  | Ethylenically unsaturated carboxylic acid monomer content ratio (wt %) | 30 | 30 | 30 | 30 | 2 | 2 |
|  |  | Aromatic vinyl monomer content ratio (wt %) | — | — | — | — | 35 | 45 |
|  |  | (Meth) acrylonitrile monomer content ratio (wt %) | — | — | — | — | — | — |
|  |  | Crosslinkable monomer content ratio (wt %) | 0.8 | 0.8 | 0.8 | 0.8 | 0.8 | 0.8 |
|  |  | Glass transition temperature (° C.) | 59 | 59 | 59 | 59 | 27 | 39 |
|  |  | Swelling ratio (times) | 3.5 | 3.5 | 3.5 | 3.5 | 4 | 3.5 |
|  |  | Application method | Spray | Spray | Spray | Spray | Spray | Spray |
|  |  | Thickness (μm) | 0.5 | 0.5 | 0.5 | 0.5 | 0.5 | 0.5 |
|  |  | Peel strength | A | A | B | A | A | A |
|  |  | Gurley value increasing ratio | A | A | A | A | A | A |
|  |  | Heat-shrinking property | A | A | A | A | A | A |
|  |  | Adhesion property of adhesive layer | A | A | A | A | A | A |
|  |  | Adhesion property of adhesive layer in electrolyte solution | A | A | A | A | A | A |
|  |  | Anti-blocking property | A | A | A | A | B | B |
|  |  | High-temperature cycle property | A | A | A | A | A | A |
|  |  | Rate property | A | A | A | A | A | A |
|  |  | Battery expansion property | B | B | B | A | B | B |

*1: a mixture of ellipsoid and polyhedron-shape having rounded apexes

TABLE 2

|  |  |  | Ex. 7 | Ex. 8 | Ex. 9 | Ex. 10 | Ex. 11 | Ex. 12 |
|---|---|---|---|---|---|---|---|---|
| Heat durable layer |  | Non-conductive particle material | Alumina | Alumina | Alumina | Alumina | Alumina | Alumina |
|  |  | Non-conductive particle form | Tetrapod | Tetrapod | Tetrapod | Tetrapod | Tetrapod | Tetrapod |
|  |  | Binder for heat-durable layer | ACL | ACL | ACL | ACL | ACL | ACL |
|  |  | Thickness (μm) | 3 | 3 | 3 | 3 | 3 | 3 |
| Adhesive layer | Particulate polymer | Acrylic acid ester monomer content ratio (wt %) | 22.2 | 17.2 | 69.2 | 69.2 | 69.2 | 69.2 |
|  |  | Ethylenically unsaturated carboxylic acid monomer content ratio (wt %) | 2 | 2 | 30 | 30 | 30 | 30 |
|  |  | Aromatic vinyl monomer content ratio (wt %) | 75 | 80 | — | — | — | — |
|  |  | (Meth) acrylonitrile monomer content ratio (wt %) | — | — | — | — | — | — |
|  |  | Crosslinkable monomer content ratio (wt %) | 0.8 | 0.8 | 0.8 | 0.8 | 0.8 | 0.8 |
|  |  | Glass transition temperature (° C.) | 76 | 84 | 59 | 59 | 59 | 59 |
|  |  | Swelling ratio (times) | 3 | 3 | 3.5 | 3.5 | 3.5 | 3.5 |
|  |  | Application method | Spray | Spray | Spray | Spray | Spray | Gravure |
|  |  | Thickness (μm) | 0.5 | 0.5 | 0.2 | 1.5 | 3 | 0.5 |
|  |  | Peel strength | A | A | A | A | A | A |
|  |  | Gurley value increasing ratio | A | A | A | B | C | C |
|  |  | Heat-shrinking property | A | A | A | A | A | A |
|  |  | Adhesion property of adhesive layer | A | A | B | A | A | A |
|  |  | Adhesion property of adhesive layer in electrolyte solution | A | A | B | A | A | A |
|  |  | Anti-blocking property | A | A | A | A | A | A |
|  |  | High-temperature cycle property | A | A | A | A | A | A |
|  |  | Rate property | A | A | A | B | C | C |
|  |  | Battery expansion property | B | B | B | B | B | B |

TABLE 3

|  |  | Comp. Ex. 1 | Comp. Ex. 2 | Comp. Ex. 3 | Comp. Ex. 4 | Comp. Ex. 5 |
|---|---|---|---|---|---|---|
| Heat durable layer | Non-conductive particle material | Alumina | Alumina | Alumina | Alumina | Alumina |
|  | Non-conductive particle form | Tetrapod | Tetrapod | Tetrapod | Tetrapod | Tetrapod |
|  | Binder for heat-durable layer | ACL | ACL | ACL | ACL | ACL |
|  | Thickness (μm) | 3 | 3 | 3 | 3 | 3 |

TABLE 3-continued

|  |  |  | Comp. Ex. 1 | Comp. Ex. 2 | Comp. Ex. 3 | Comp. Ex. 4 | Comp. Ex. 5 |
|---|---|---|---|---|---|---|---|
| Adhesive layer | Particulate polymer | Acrylic acid ester monomer content ratio (wt %) | — | 74.2 | 29.2 | 87.8 | 87.8 |
|  |  | Ethylenically unsaturated carboxylic acid monomer content ratio (wt %) | — | 10 | 30 | 2 | 2 |
|  |  | Aromatic vinyl monomer content ratio (wt %) | — | 15 | 40 | — | — |
|  |  | (Meth) acrylonitrile monomer content ratio (wt %) | — | — | — | 10 | 10 |
|  |  | Crosslinkable monomer content ratio (wt %) | — | 0.8 | 0.8 | 0.2 | 0.2 |
|  |  | Glass transition temperature (° C.) | — | 5 | 112 | 5 | 5 |
|  |  | Swelling ratio (times) | — | 3 | 2 | 17 | 17 |
|  | Application method |  | — | Spray | Spray | Spray | Gravure |
|  | Thickness (μm) |  | — | 0.5 | 0.5 | 0.5 | 10 |
| Peel strength |  |  | A | A | A | A | A |
| Gurley value increasing ratio |  |  | A | C | A | A | D |
| Heat-shrinking property |  |  | A | A | A | A | A |
| Adhesion property of adhesive layer |  |  | C | — | C | — | — |
| Adhesion property of adhesive layer in electrolyte solution |  |  | C | — | C | — | — |
| Anti-blocking property |  |  | A | D | A | C | C |
| High-temperature cycle property |  |  | A | — | A | — | — |
| Rate property |  |  | A | — | A | — | — |
| Battery expansion property |  |  | B | — | B | — | — |

[Discussion on Results]

From Tables 1 to 3, it is found that the secondary battery separator as shown in Examples 1 to 12 comprising an organic separator layer, a heat-durable layer formed adjacent to at least one surface of the organic separator layer, and an adhesive layer formed on the heat-durable layer, wherein the heat-durable layer contains non-conductive particles and a binder, and the adhesive layer contains a particulate polymer having a glass transition temperature of 10 to 100° C. is superior to the secondary battery separator of Comparative Examples 1 to 5 wherein such an adhesive layer was not used, from the viewpoints of all of heat durability, adhesion property with the electrode active material, and anti-blocking property. It is further found that the secondary battery having the secondary battery separator has good high-temperature cycle property and rate property.

The invention claimed is:

1. A secondary battery separator comprising an organic separator layer, a heat-durable layer formed adjacent to at least one surface of the organic separator layer, and an adhesive layer formed on the heat-durable layer, wherein
the heat-durable layer contains non-conductive particles and a binder,
the adhesive layer contains a particulate polymer having a glass transition temperature of 10 to 100° C.,
a content ratio of the particulate polymer in the adhesive layer is 60 to 100 wt %, and
the particulate polymer contains an ethylenically unsaturated carboxylic acid monomer unit, and a content ratio of the ethylenically unsaturated carboxylic acid monomer unit in the particulate polymer is 30 to 50 wt %.

2. The secondary battery separator according to claim 1, wherein the particulate polymer contains a crosslinkable monomer unit, and the content ratio of the crosslinkable monomer unit in the particulate polymer is 0.1 to 2 wt %.

3. The secondary battery separator according to claim 1, wherein the swelling ratio of the particulate polymer in a reference solution at 20° C. is 1.1 to 15 times, the reference solution being 1 mol/L LiPF$_6$ dissolved in a mixture solvent of ethylene carbonate (EC) and diethyl carbonate (DEC) which are mixed at a volume ratio of EC:DEC=1:2.

4. The secondary battery separator according to claim 1, wherein a thickness of the adhesive layer is 0.1 μm to 5 μm.

5. A secondary battery comprising a positive electrode, a negative electrode, a separator and an electrolyte solution, wherein the separator is the secondary battery separator of claim 1.

6. A method for producing the secondary battery separator according to claim 1, comprising:
applying onto an organic separator layer a slurry for a heat-durable layer containing a non-conductive particles and a binder, and then drying the slurry, to form a heat-durable layer; and
applying onto the heat-durable layer a slurry for an adhesive layer containing a particulate polymer having a glass transition temperature of 10 to 100° C., and then drying the slurry, to form an adhesive layer.

* * * * *